(12) United States Patent
Koyama et al.

(10) Patent No.: US 7,952,814 B2
(45) Date of Patent: May 31, 2011

(54) LENS BARREL AND IMAGING APPARATUS

(75) Inventors: Takashi Koyama, Tokyo (JP); Takashi Kato, Osaka (JP)

(73) Assignee: Sony Corporation, Tokyo (JP)

(*) Notice: Subject to any disclaimer, the term of this patent is extended or adjusted under 35 U.S.C. 154(b) by 297 days.

(21) Appl. No.: 12/219,703

(22) Filed: Jul. 28, 2008

(65) Prior Publication Data

US 2009/0059390 A1 Mar. 5, 2009

(30) Foreign Application Priority Data

Sep. 4, 2007 (JP) .................................. 2007-229477

(51) Int. Cl.
G02B 15/14 (2006.01)

(52) U.S. Cl. .......... 359/699; 359/701; 359/704; 396/75; 396/83; 396/86

(58) Field of Classification Search .......... 359/694–704, 359/557; 396/55, 72–79, 83, 294, 348, 349
See application file for complete search history.

(56) References Cited

U.S. PATENT DOCUMENTS

| | | | | |
|---|---|---|---|---|
| 4,226,520 A | * | 10/1980 | Uesugi | 396/79 |
| 4,840,470 A | * | 6/1989 | Ohtake | 359/699 |
| 5,699,200 A | * | 12/1997 | Uno et al. | 359/700 |
| 6,353,710 B1 | * | 3/2002 | Ichino | 396/83 |
| 7,308,195 B2 | * | 12/2007 | Yumiki et al. | 396/75 |
| 7,653,295 B2 | * | 1/2010 | Yumiki et al. | 396/55 |

FOREIGN PATENT DOCUMENTS

| | | |
|---|---|---|
| JP | 57-162606 A | 10/1982 |
| JP | 11-305105 A | 11/1999 |
| JP | 11-311733 | 11/1999 |
| JP | 2001-188161 A | 7/2001 |
| JP | 2005-07745 A | 3/2005 |
| JP | 2007-003642 A | 1/2007 |

OTHER PUBLICATIONS

Japanese Office Action issued Jul. 21, 2009 for corresponding Japanese Application No. 2007-229477.

* cited by examiner

*Primary Examiner* — Loha Ben
(74) *Attorney, Agent, or Firm* — Rader, Fishman & Grauer PLLC

(57) ABSTRACT

A lens barrel includes at least two cam tubes, and an operation based on the rotation of an operation ring actuates the two cam tubes to move a lens group. The lens barrel includes a first cam tube that drives part of the lens group in response to an operation based on the rotation of the operation ring, and a second cam tube that moves part of the lens group in the optical axis direction in response to the operation based on the rotation of the operation ring. The second cam tube rotates at a speed different from that of the first cam tube.

6 Claims, 32 Drawing Sheets

NORMAL INCLINATION

STEEP INCLINATION

GENTLE INCLINATION

CAM CURVE

NEAR POSITION ON WIDE-ANGLE SIDE

INFINITY POSITION ON TELESCOPIC SIDE

FIG. 35 NEAR POSITION ON TELESCOPIC SIDE

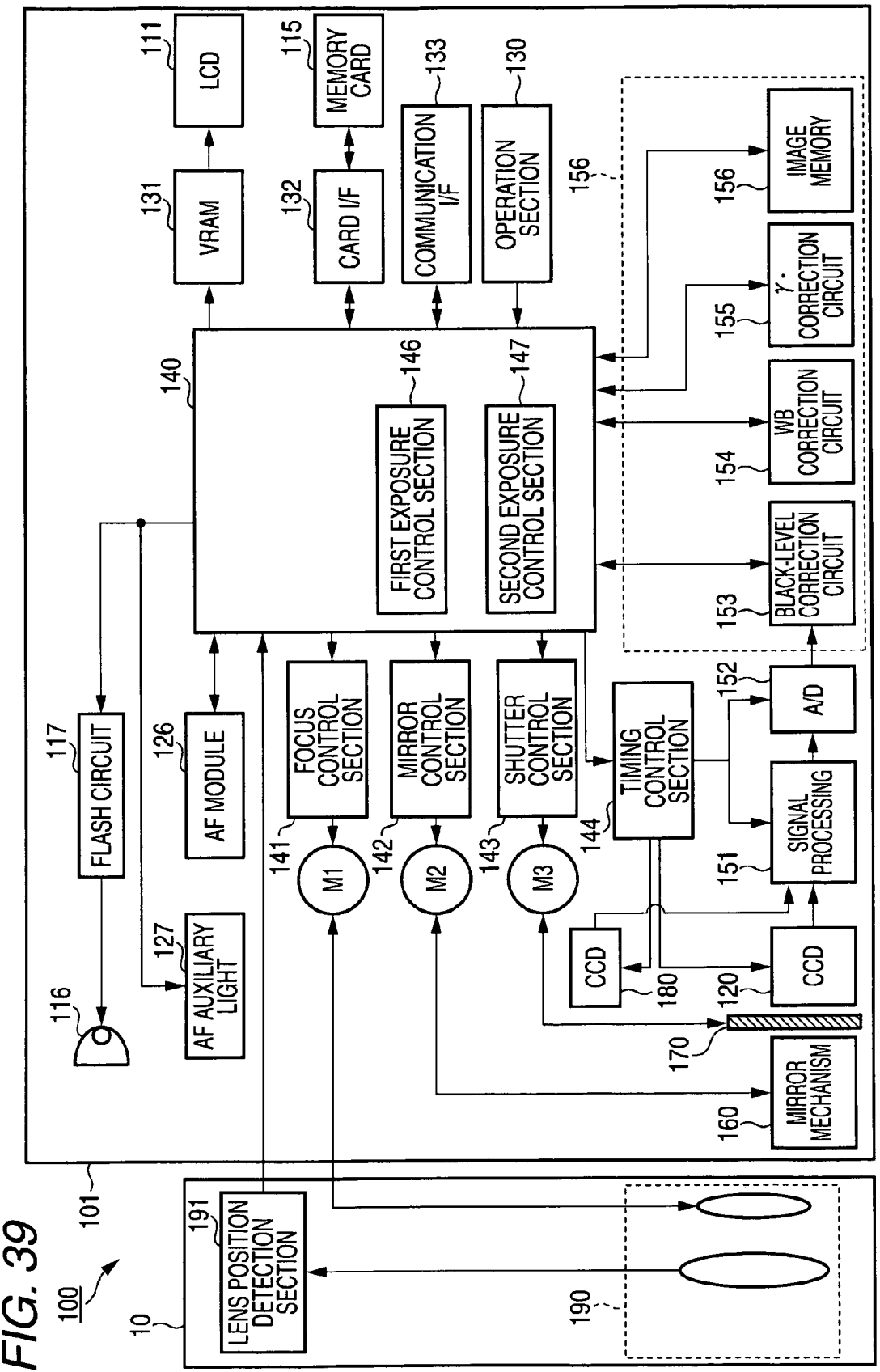

LENS BARREL AND IMAGING APPARATUS

CROSS REFERENCES TO RELATED APPLICATIONS

The present invention contains subject matter related to Japanese Patent Application JP 2007-229477 filed in the Japanese Patent Office on Sep. 4, 2007, the entire contents of which being incorporated herein by reference.

BACKGROUND OF THE INVENTION

1. Field of the Invention

The present invention relates to a lens barrel for a zoom lens and other lenses, and an imaging apparatus, such as a digital single lens reflex camera, including the lens barrel.

2. Description of the Related Art

An example of the lens barrel of this type of related art is described, for example, in JP-A-11-311733. JP-A-11-311733 describes a zoom lens in which the amount of travel in a focusing operation on the telescopic side differs from that on the wide-angle side. The zoom lens described in JP-A-11-311733 is "an inner-focus and rear-focus zoom lens including a zooming operation ring that is rotated for a zooming operation, a focus operation ring that is rotated for a focusing operation, a rotatable and translatable tube that rotates and translates back and forth when the zooming operation ring is rotated, the rotation and translation caused by a first cam mechanism that cooperates with a fixed member and to which the rotation of the zooming operation ring is transmitted, a rotatable tube that engages projections provided on the outer circumferential surface of the rotatable and translatable tube so that the rotation of the rotatable and translatable tube is transmitted to the rotatable tube, a first lens group that is translated back and forth while being linearly guided along a first guide member when the rotatable tube rotates, the translation caused by a second cam mechanism that cooperates with the rotatable tube, a second lens group that is translated back and forth when the rotatable and translatable tube rotates, the translation caused by a third cam mechanism that cooperates with the rotatable and translatable tube, and a second guide member that is integrated with the focus operation ring, the second guide member linearly guiding the second lens group when the rotatable and translatable tube rotates and rotating the second lens group when the focus operation ring rotates so as to translate the second lens group back and forth under the guidance of the third cam mechanism."

According to the thus configured zoom lens described in JP-A-11-311733, when the zooming operation ring is rotated in the zooming operation, the first cam mechanism rotates and translates the rotatable and translatable tube back and forth. Further, when the rotatable and translatable tube rotates, the third cam mechanism linearly translates the second lens group to a predetermined position under the guidance of the second guide member. The rotation of the rotatable and translatable tube is transmitted through the projections to the rotatable tube outside the rotatable and translatable tube. When the rotatable tube rotates, the second cam mechanism translates the first lens group to a predetermined position under the guidance of the first guide member. On the other hand, when the focus operation ring is rotated in the focusing operation, the second guide member rotates the second lens group, and the third cam mechanism translates the second lens group back and forth by an amount of travel according to the zooming position. The focusing operation is thus completed.

The zoom lens described in JP-A-11-311733, however, has the following problem. That is, since a second zoom synchronized lever connects a cam ring to a cam ring for a fourth lens group, the space is used in a manner with significantly poor efficiency. One reason for such a problem is that since the rotation angle of the zooming operation ring typically ranges from approximately 70 to 120 degrees, a significantly large space is necessary to rotate the sturdy second synchronized lever within the angular range. A second reason for the above problem is that although a larger amount of travel of the first lens group may require a larger amount of travel of the cam ring, the fact that the second zoom synchronized lever is supported by the cam ring limits the amount of travel of the first lens group to a value determined by the amount of travel of the cam ring for the fourth lens group (the amount of travel of the third lens group) and the length (total length) thereof. Such limitation prevents reduction in size of the entire zoom lens, and also prevents improvement in optical performance.

Recent digital single lens reflex cameras have significantly advanced in terms of their compactness, resolution, and performance. A typical structure for achieving compactness is often configured in such a way that at least two cam rings are rotated and one of the cam rings is translated in the optical axis direction. Such a structure may be essential to reduce the size of the barrel while maximizing the amount of lens travel and reduce the zooming torque. A challenge in the design phase is a connection mechanism for rotating the cam rings when the zooming operation ring is rotated, because the connection mechanism typically takes up a large space and it is therefore necessary to provide a space for such a large connection mechanism.

It has been significantly important to solve the above problems and design and manufacture a compact lens barrel with high performance at a low cost.

SUMMARY OF THE INVENTION

The present inventors have recognized that, in the lens barrel of related art, since the second zoom synchronized lever is supported by the cam ring, the amount of travel of the cam ring for the fourth lens group and the length thereof limit the amount of travel of the first lens group and hence a large amount of travel of the cam ring may not be provided.

A lens barrel according to an embodiment of the invention includes at least two cam tubes, and an operation based on the rotation of an operation ring actuates the two cam tubes to move a lens group. The lens barrel includes a first cam tube that drives part of the lens group in response to an operation based on the rotation of the operation ring, and a second cam tube that moves part of the lens group in the optical axis direction in response to the operation based on the rotation of the operation ring. The second cam tube rotates at a speed different from that of the first cam tube.

An imaging apparatus according to an embodiment of the invention includes a lens barrel including at least two cam tubes in which an operation based on the rotation of an operation ring actuates the two cam tubes to move a lens group. The lens barrel includes a first cam tube that drives part of the lens group in response to an operation based on the rotation of the operation ring, and a second cam tube that moves part of the lens group in the optical axis direction in response to the operation based on the rotation of the operation ring. The second cam tube rotates at a speed different from that of the first cam tube.

In the lens barrel and the imaging apparatus according to an embodiment of the invention, a mechanical part that connects the two cam tubes can be eliminated to reduce the entire size.

It is further possible to provide freedom to change the rotation speeds of the two cam tubes, optimize the cam curves, improve the optical performance, and improve operation feeling (focusing torque and zooming torque).

BRIEF DESCRIPTION OF THE DRAWINGS

FIG. 3A is a perspective view as viewed from the front and FIG. 3B is a perspective view as viewed from the rear;

FIG. 11A is the development showing a normally inclined lead groove, FIG. 11B is the development showing a steeply inclined lead groove, FIG. 11C is the development showing a gently inclined lead groove, and FIG. 11D is the development showing a lead groove having a cam curve;

FIG. 16A is a perspective view showing the state in which the fixed tube is assembled to the zoom cam ring, and FIG. 16B is a perspective view showing the state in which the fixed tube and the fourth-group cam ring are assembled to the zoom cam ring;

FIG. 18A is a perspective view as viewed from the front, and FIG. 18B a perspective view as viewed from the rear;

FIG. 23A is the general development and FIG. 23B is an enlarged view of the key portion;

FIG. 25A is a perspective view in an infinity position (INF) on the wide-angle side and FIG. 25B is a perspective view in a near position (NEAR) on the wide-angle side;

FIG. 27A is a front view, FIG. 27B is a side view, and FIG. 27C is a cross-sectional view;

FIG. 28A is a perspective view in the infinity position (INF) on the wide-angle side and FIG. 28B is a perspective view in a near position (NEAR) on the telescopic side;

FIG. 29A is a perspective view as viewed from the front and FIG. 29B is a perspective view as viewed from the rear;

FIG. 39 is a descriptive block diagram showing a schematic configuration of the digital single lens reflex camera showing the first example of the imaging apparatus using a lens barrel according to an embodiment of the invention.

DESCRIPTION OF THE PREFERRED EMBODIMENTS

In a lens barrel, an operation ring and two cam tubes are provided. Operating the operation ring to move the second cam tube in the optical direction and setting the rotation speed of the second cam tube to be different from that of the first cam tube allow a simply configured lens barrel and imaging apparatus to contribute to reduction in size, enhancement in quality, and reduction in cost.

Figure 1:
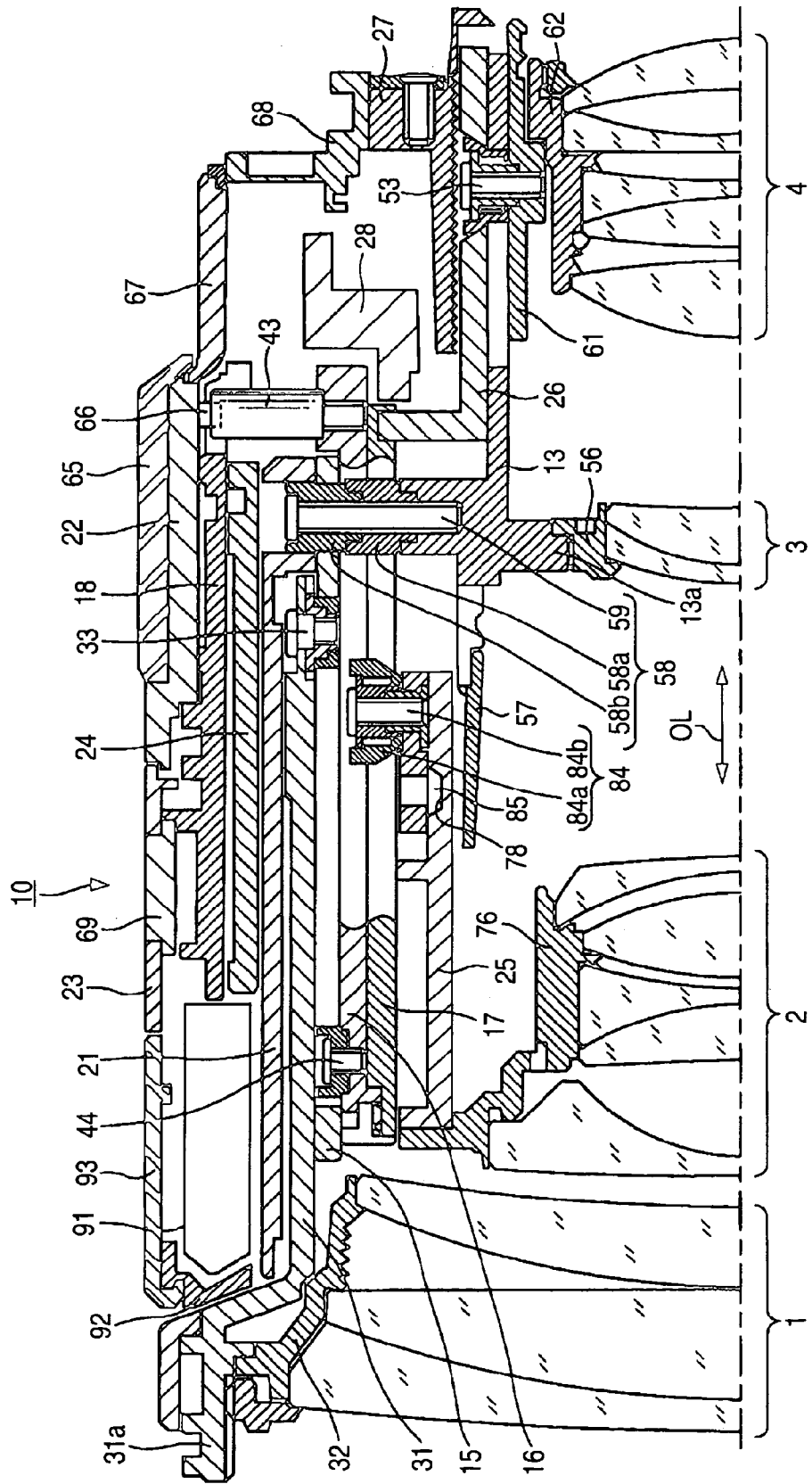
FIG. 1 is a cross-sectional view showing the upper half of a first example of a lens barrel according to an embodiment of the invention.
Figure 2:
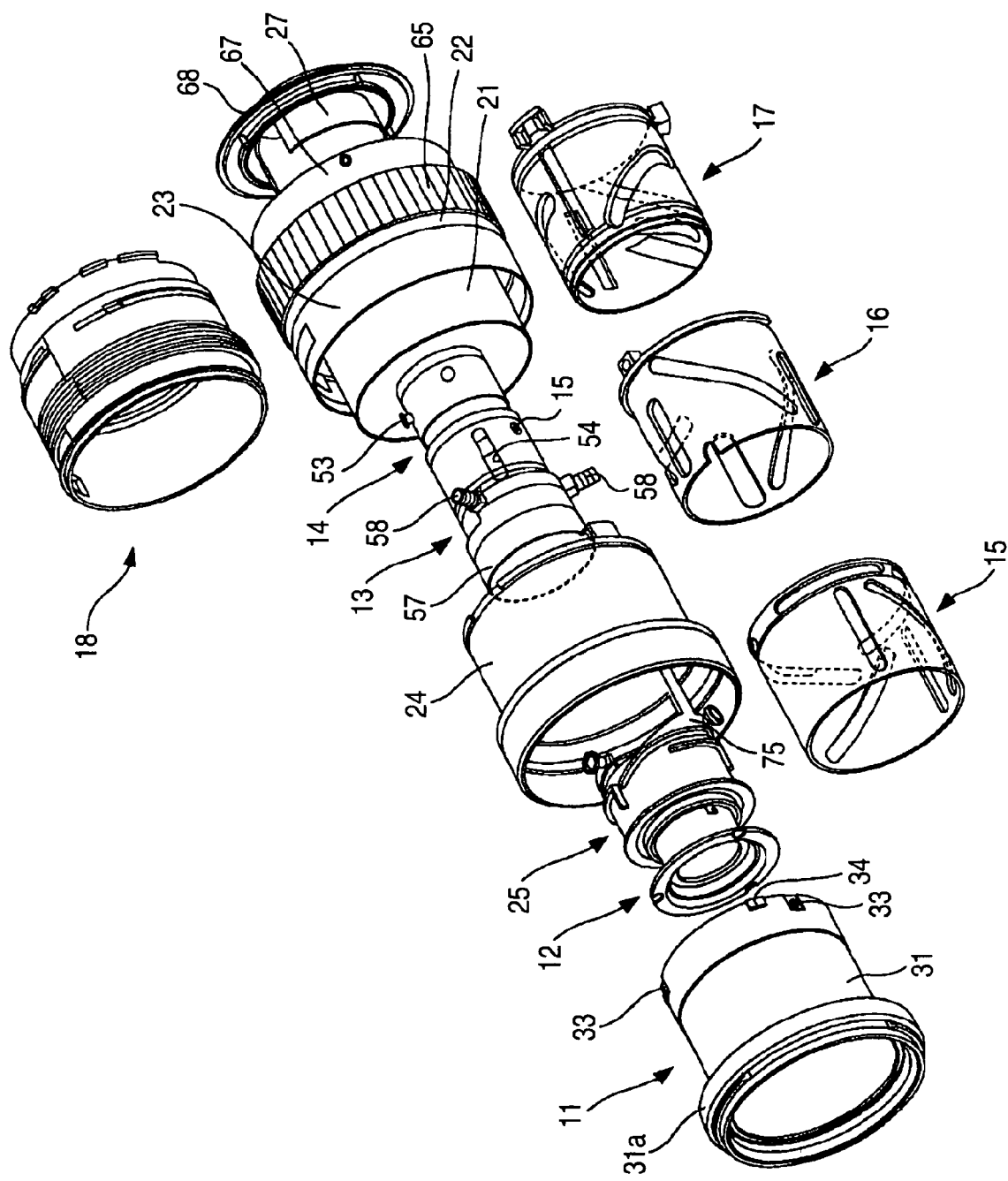
FIG. 2 is a perspective exploded view showing the first example of the lens barrel according to an embodiment of the invention.
Figure 3A:
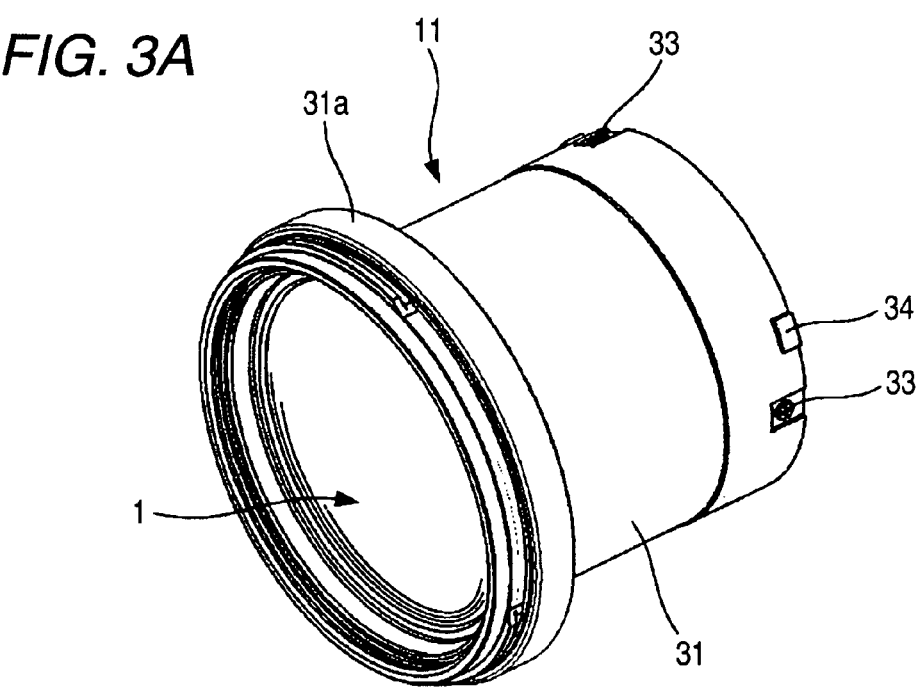
FIGS. 3A and 3B show a first-group frame in the lens barrel according to an embodiment of the invention.
Figure 3B:
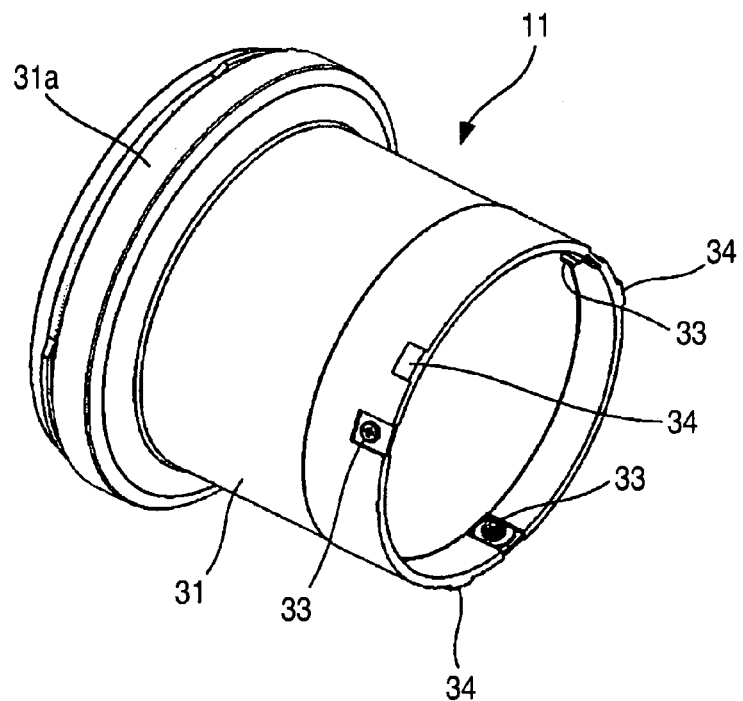
Figure 4:
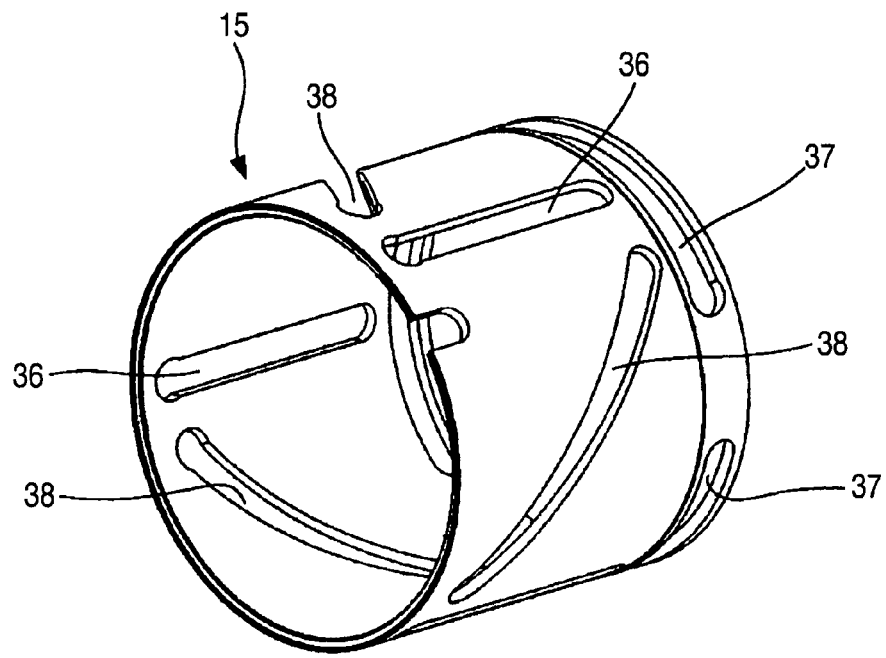
FIG. 4 is a perspective view showing a first-group cam ring (second cam tube) in the lens barrel according to an embodiment of the invention.
Figure 5:
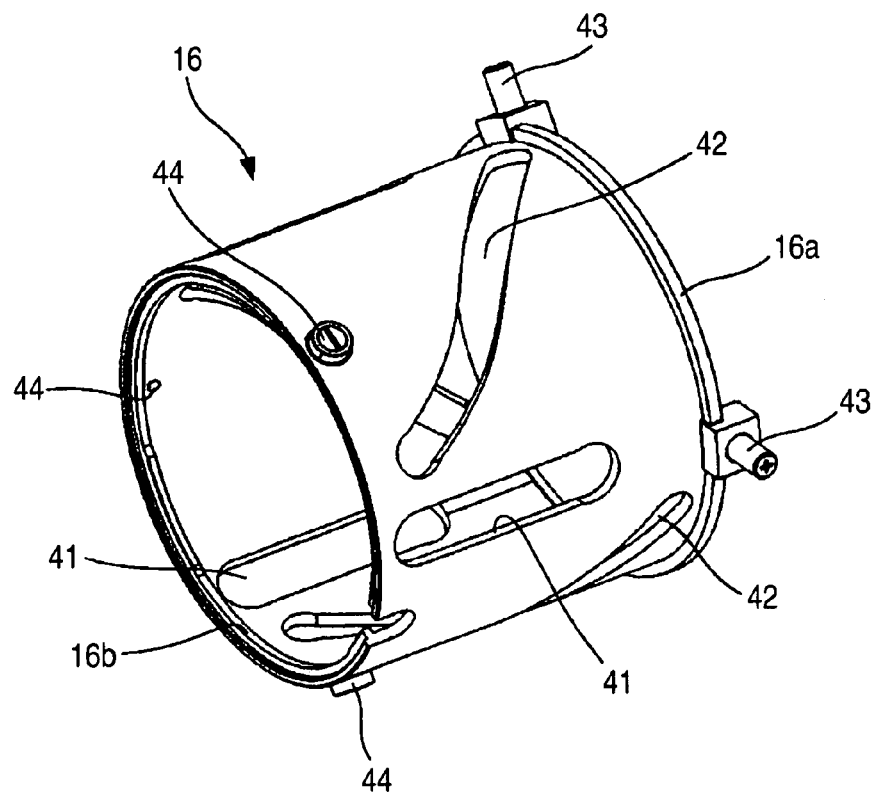
FIG. 5 is a perspective view showing a zoom cam ring (first cam tube) in the lens barrel according to an embodiment of the invention.
Figure 6:
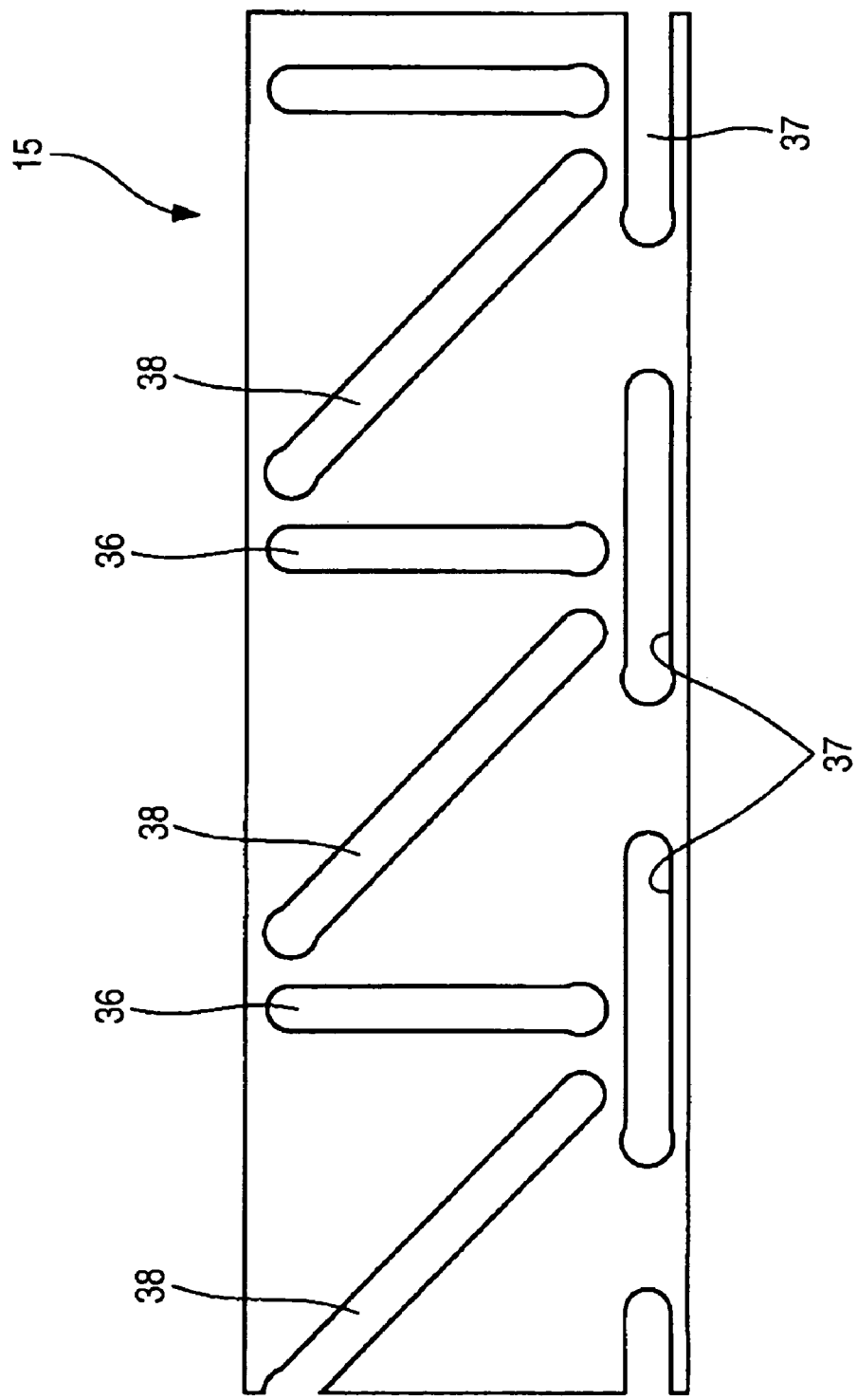
FIG. 6 is the development showing cam grooves and other portions of the first-group cam ring (second cam tube) in the lens barrel according to an embodiment of the invention.
Figure 7:
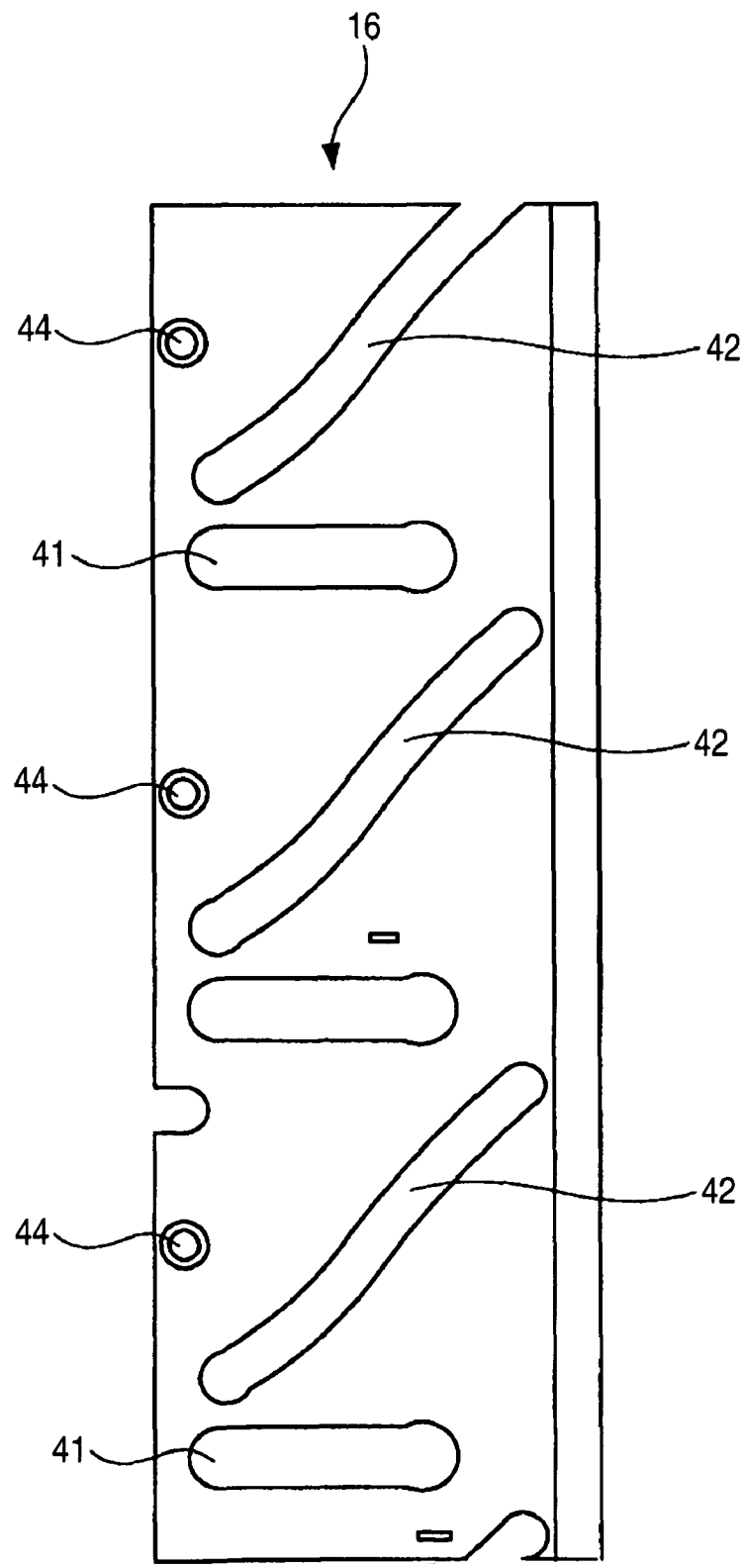
FIG. 7 is the development showing cam grooves and other portions of the zoom cam ring (first cam tube) in the lens barrel according to an embodiment of the invention.
Figure 8:
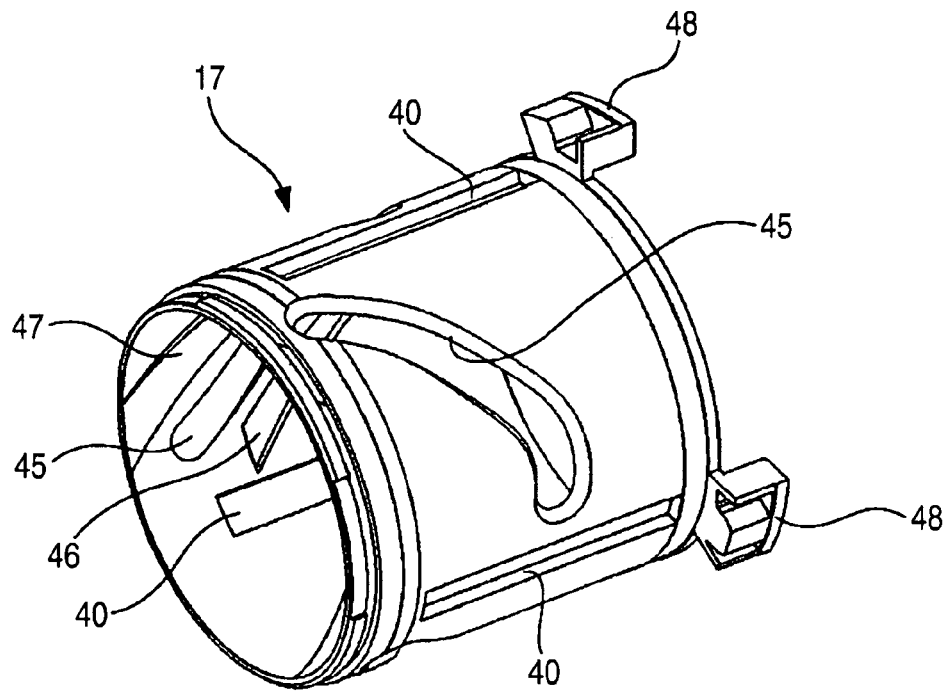
FIG. 8 is a perspective view showing a fixed tube in the lens barrel according to an embodiment of the invention.
Figure 9:
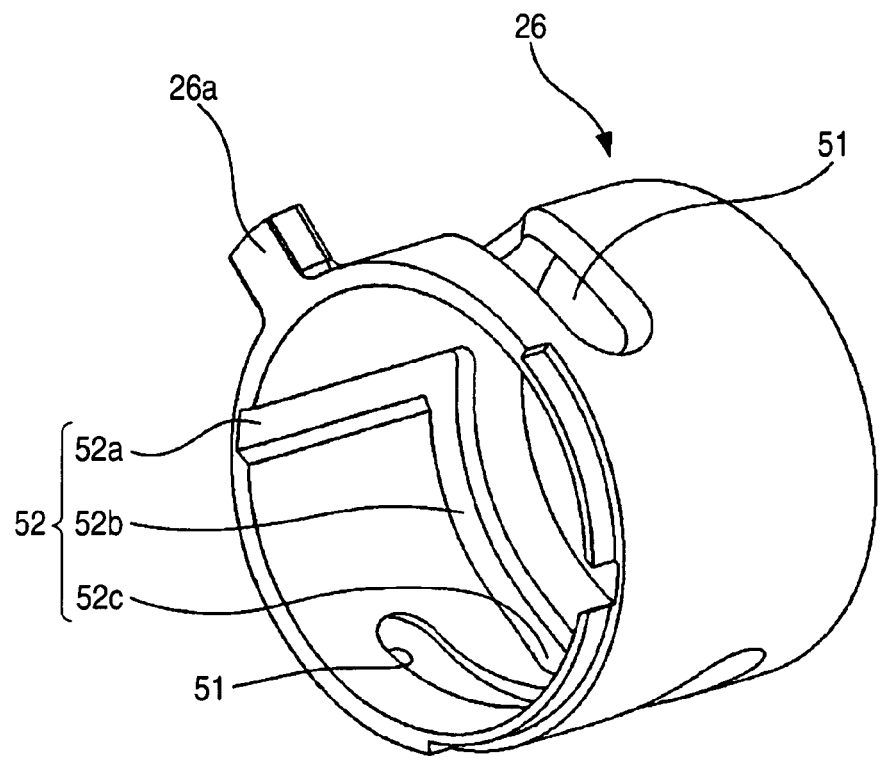
FIG. 9 is a perspective view showing fourth-group cam ring (third cam tube) in the lens barrel according to an embodiment of the invention.
Figure 10:
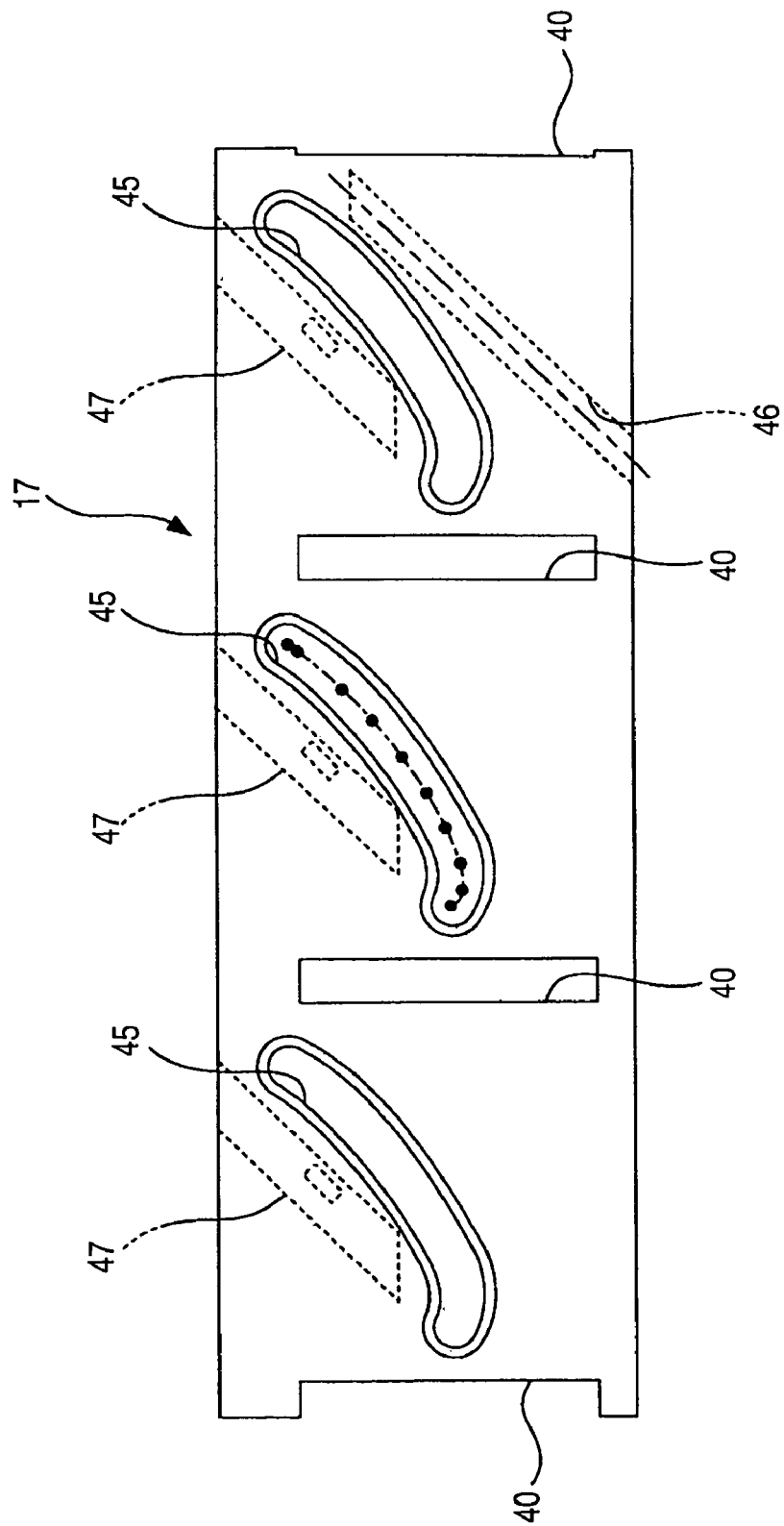
FIG. 10 is the development showing cam grooves and other portions of the fixed tube in the lens barrel according to an embodiment of the invention.
Figure 12:
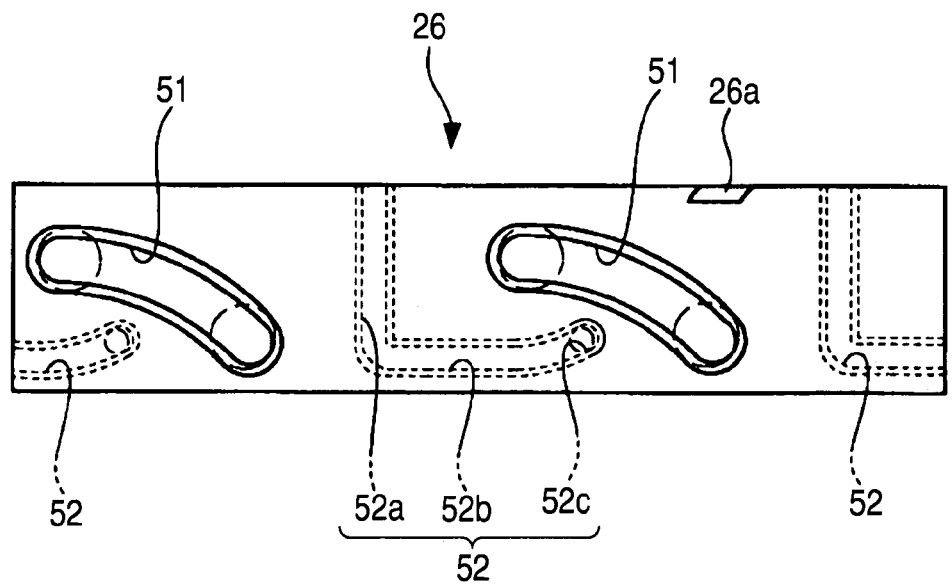
FIG. 12 is the development showing cam grooves and other portions of the fourth-group cam ring in the lens barrel according to an embodiment of the invention.
Figure 13:
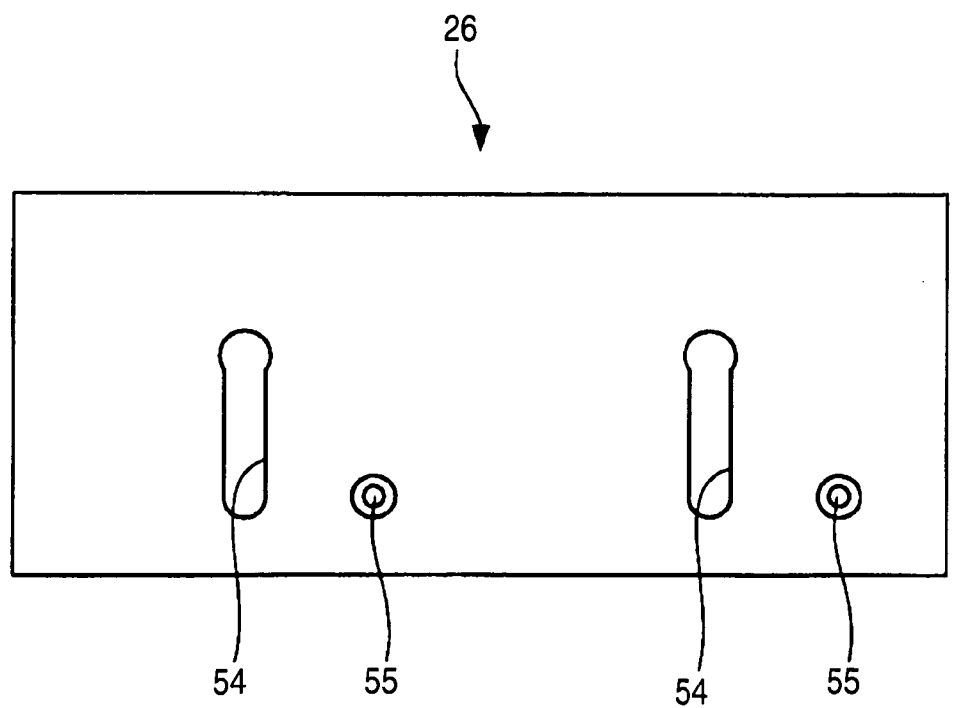
FIG. 13 is the development of a third-group moving frame in the lens barrel according to an embodiment of the invention.
Figure 14:
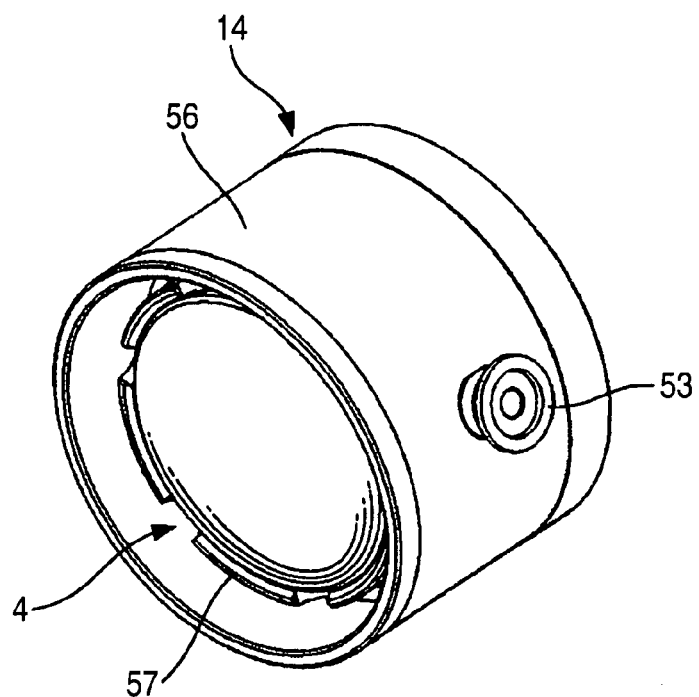
FIG. 14 is a perspective view showing a fourth-group frame unit in the lens barrel according to an embodiment of the invention.
Figure 15:
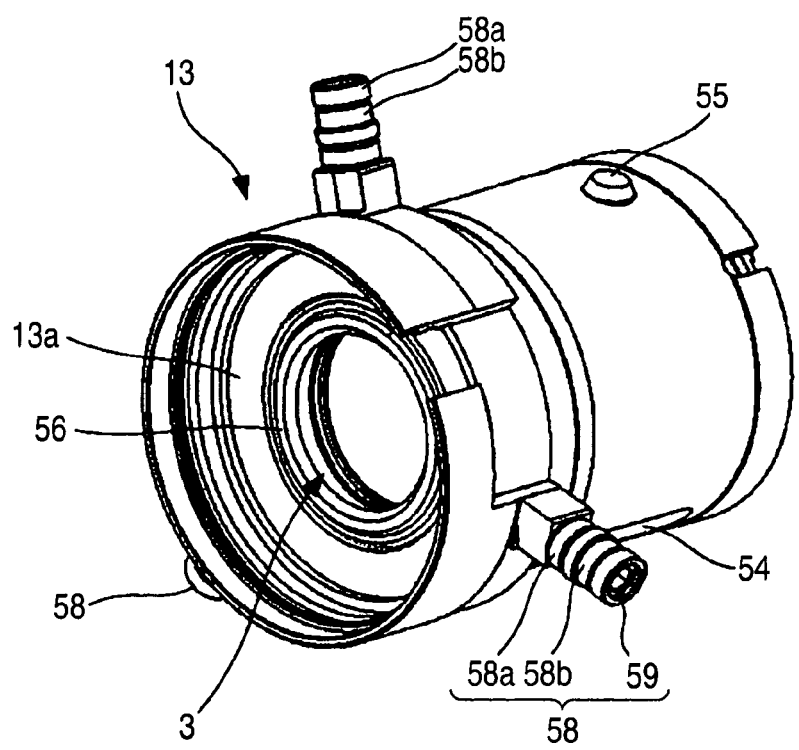
FIG. 15 is a perspective view showing the third-group moving frame in the lens barrel according to an embodiment of the invention.
Figure 16A:
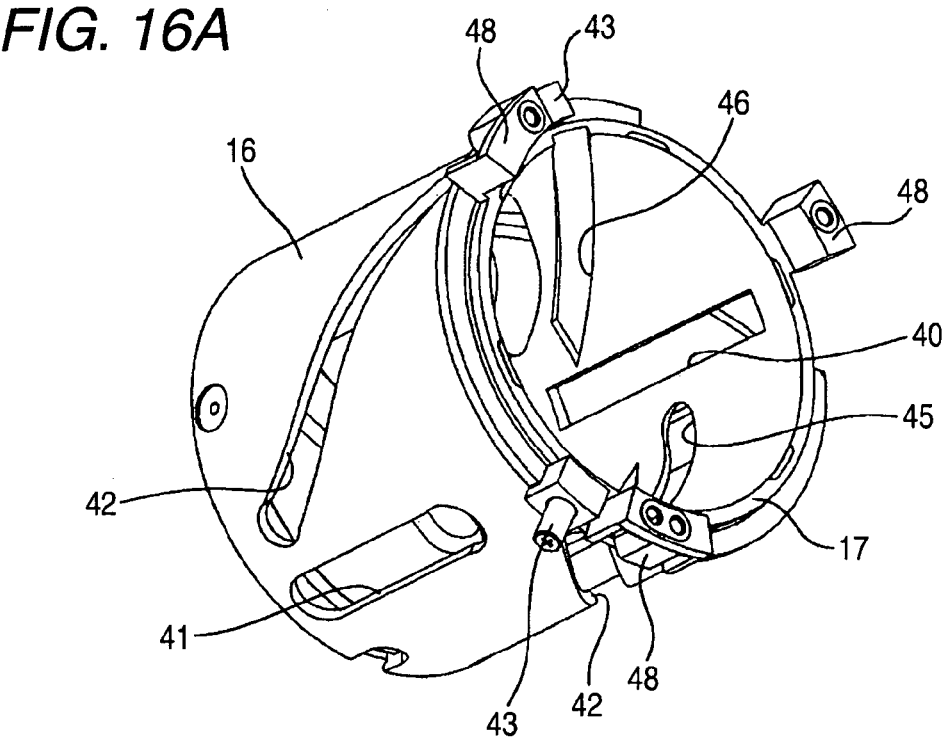
FIGS. 16A and 16B show the state in which the zoom cam ring and other components in the lens barrel according to an embodiment of the invention are assembled.
Figure 16B:
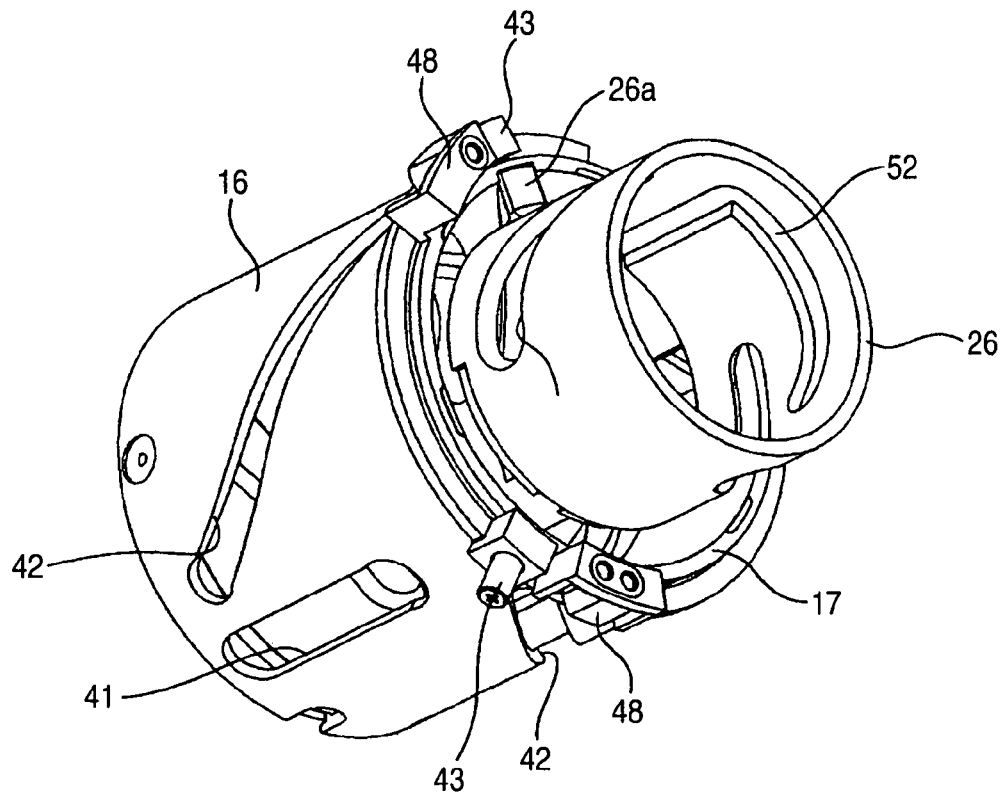
Figure 17:
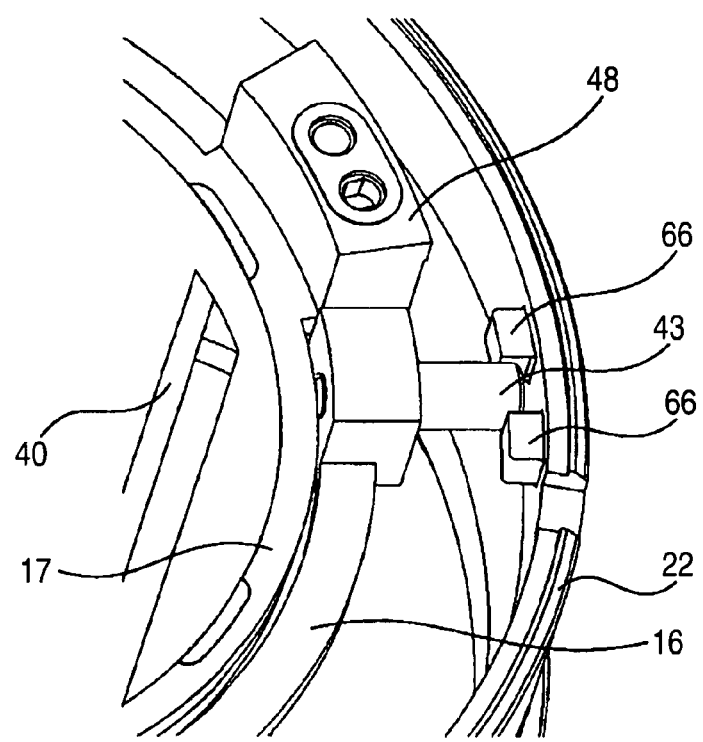
FIG. 17 is a descriptive diagram showing the relationship between the fixed tube and a zooming operation ring in the lens barrel according to an embodiment of the invention.
Figure 18A:
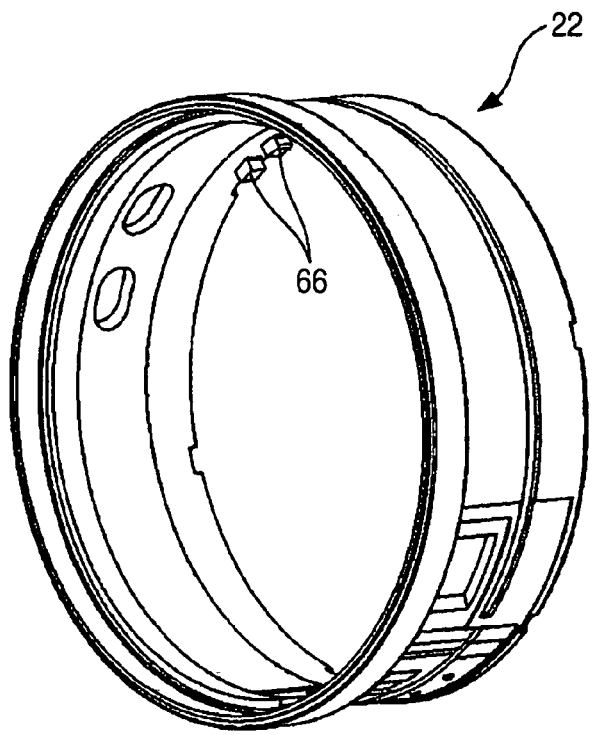
FIGS. 18A and 18B show of the zooming operation ring in the lens barrel according to an embodiment of the invention.
Figure 18B:
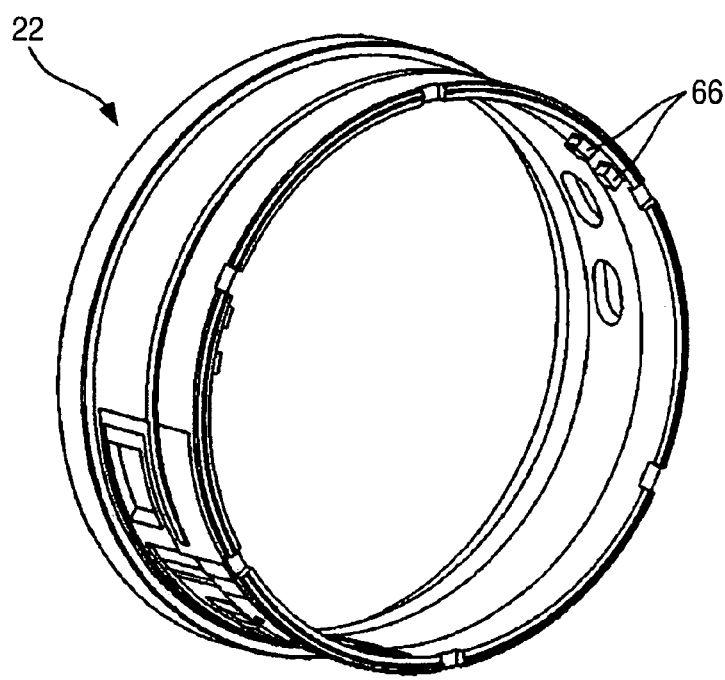
Figure 19:
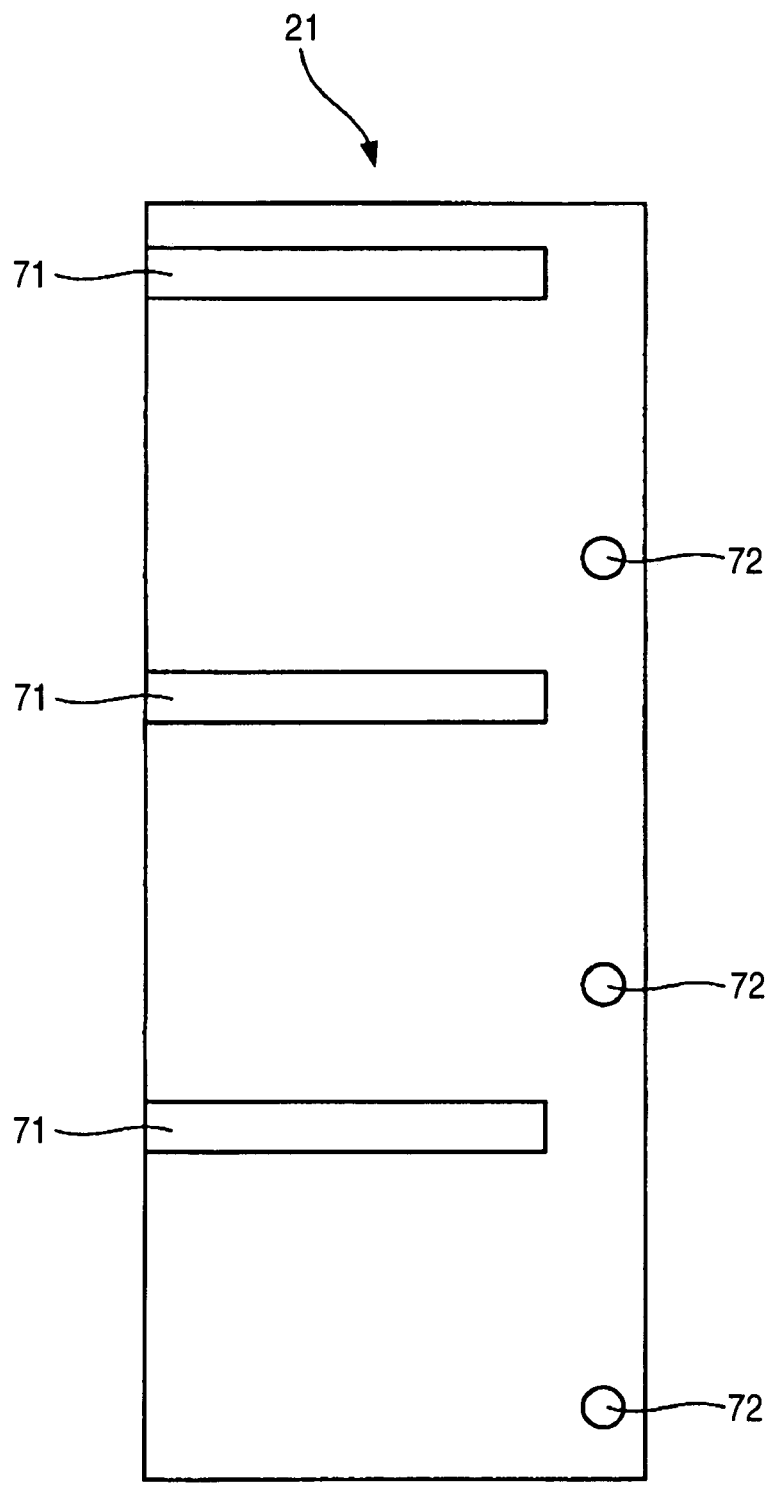
FIG. 19 is the development showing cam grooves and other portions of a first-group guide ring in the lens barrel according to an embodiment of the invention.
Figure 20:
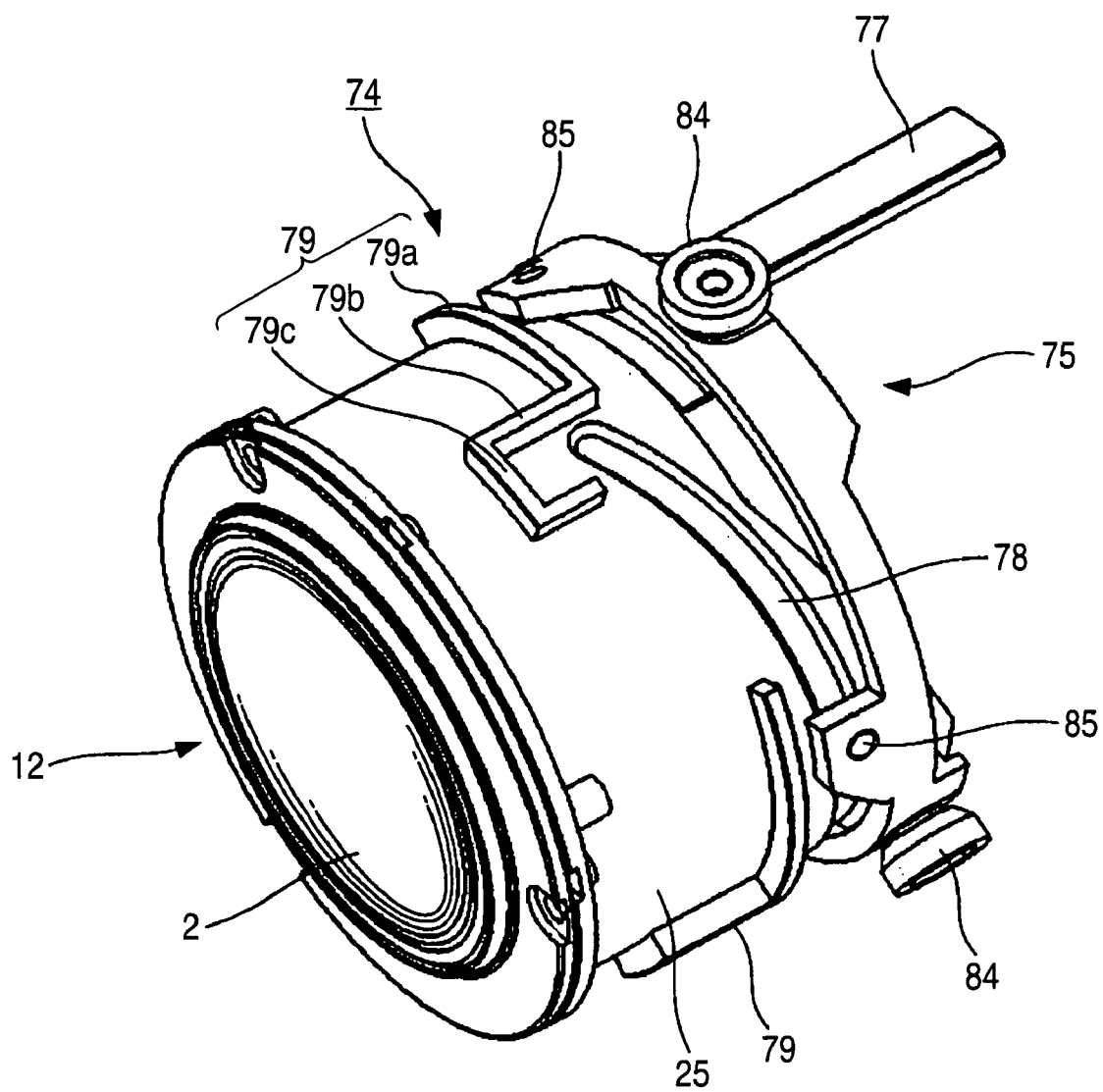
FIG. 20 is a perspective view showing the state in which a focus cam ring and other components in the lens barrel according to an embodiment of the invention are assembled.
Figure 21:
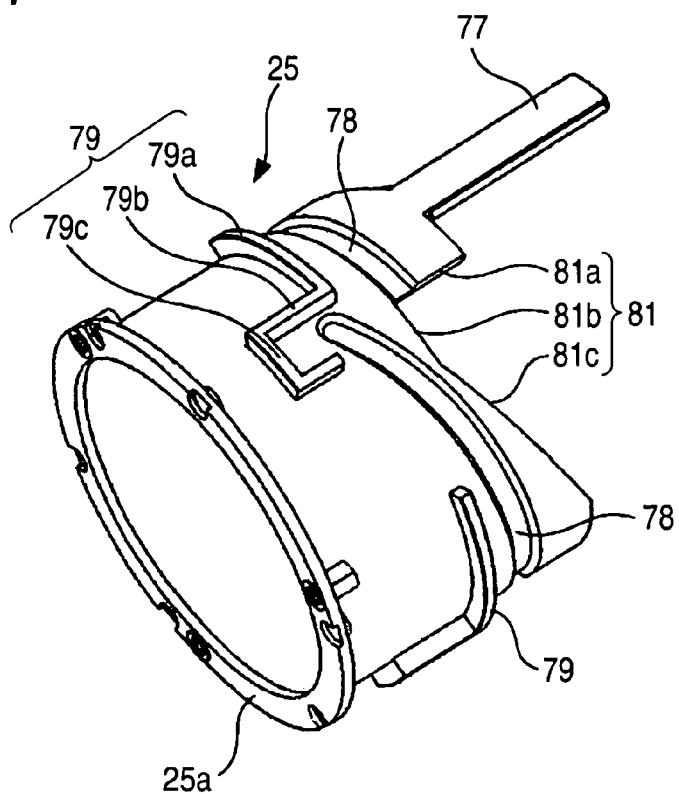
FIG. 21 is a perspective view of the focus cam ring in the lens barrel according to an embodiment of the invention.
Figure 22:
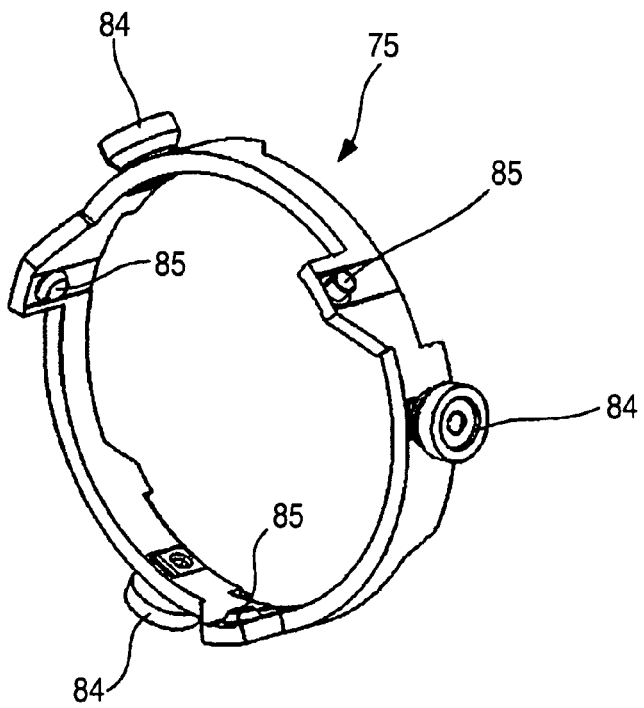
FIG. 22 is a perspective view of a second-group moving frame in the lens barrel according to an embodiment of the invention.
Figure 23A:
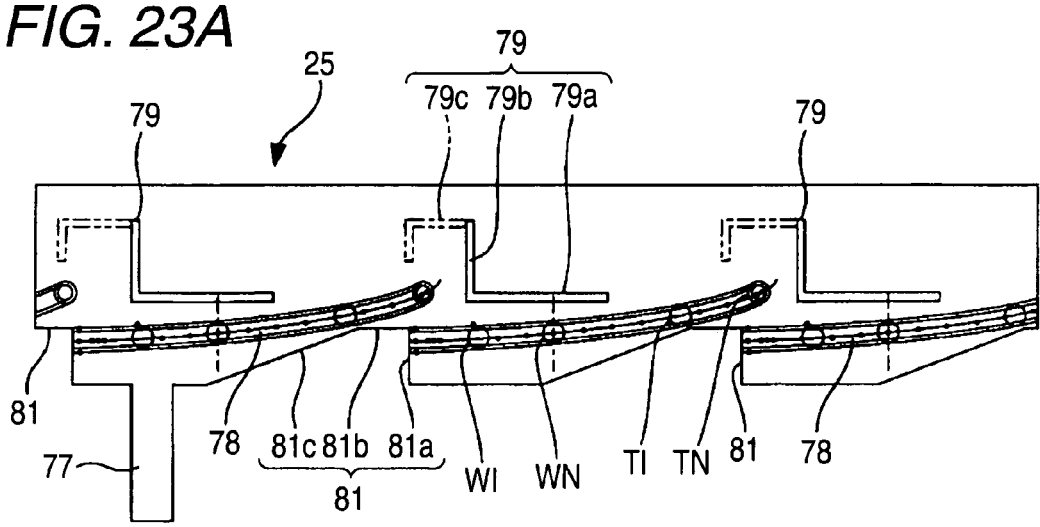
FIGS. 23A and 23B show cam grooves and other portions of the focus cam ring in the lens barrel according to an embodiment of the invention.
Figure 23B:
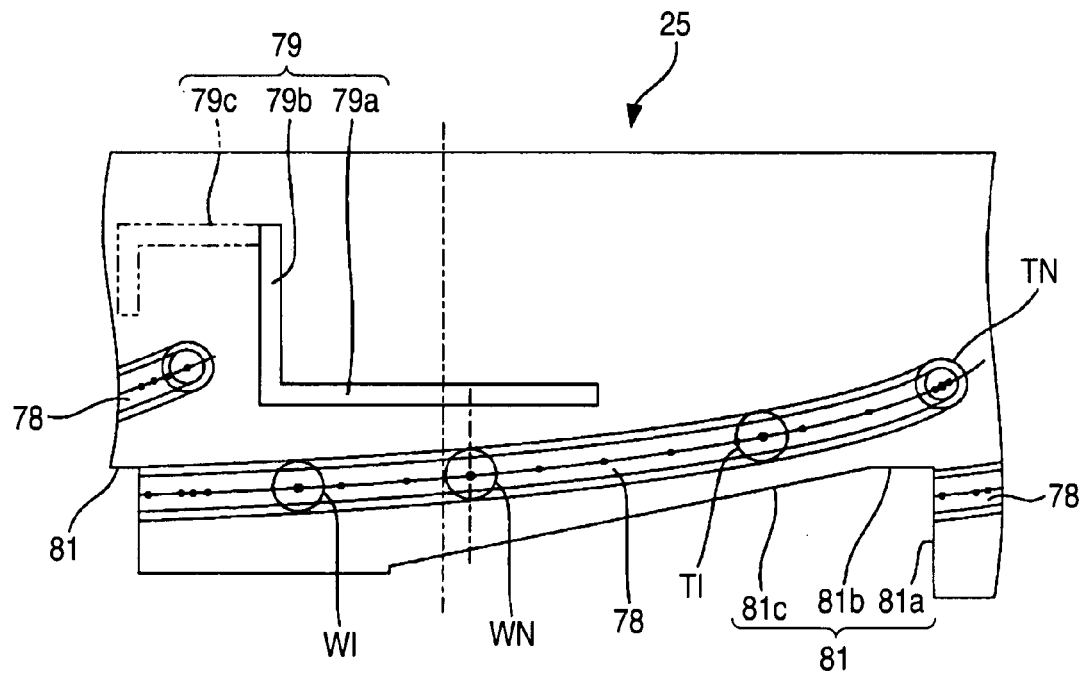
Figure 24:
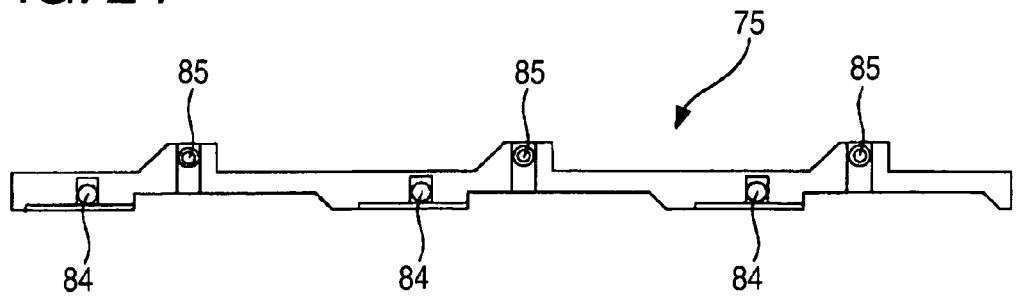
FIG. 24 is the development of the second-group moving frame in the lens barrel according to an embodiment of the invention.
Figure 25A:
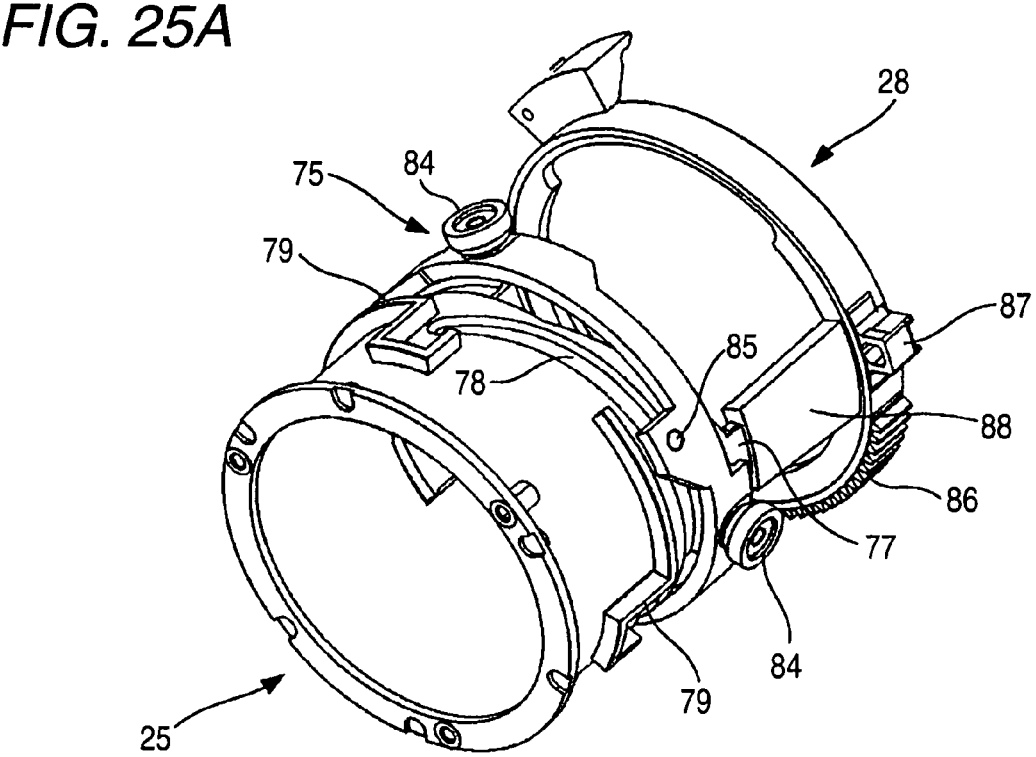
FIGS. 25A and 25B explain the lens barrel according to an embodiment of the invention in a zooming operation.
Figure 25B:
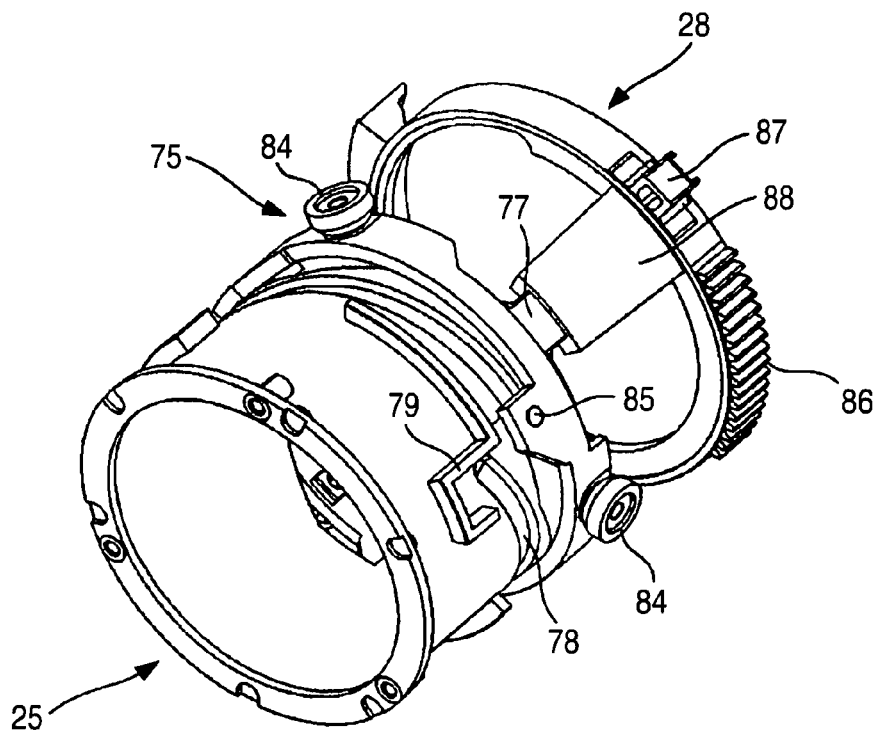
Figure 26:
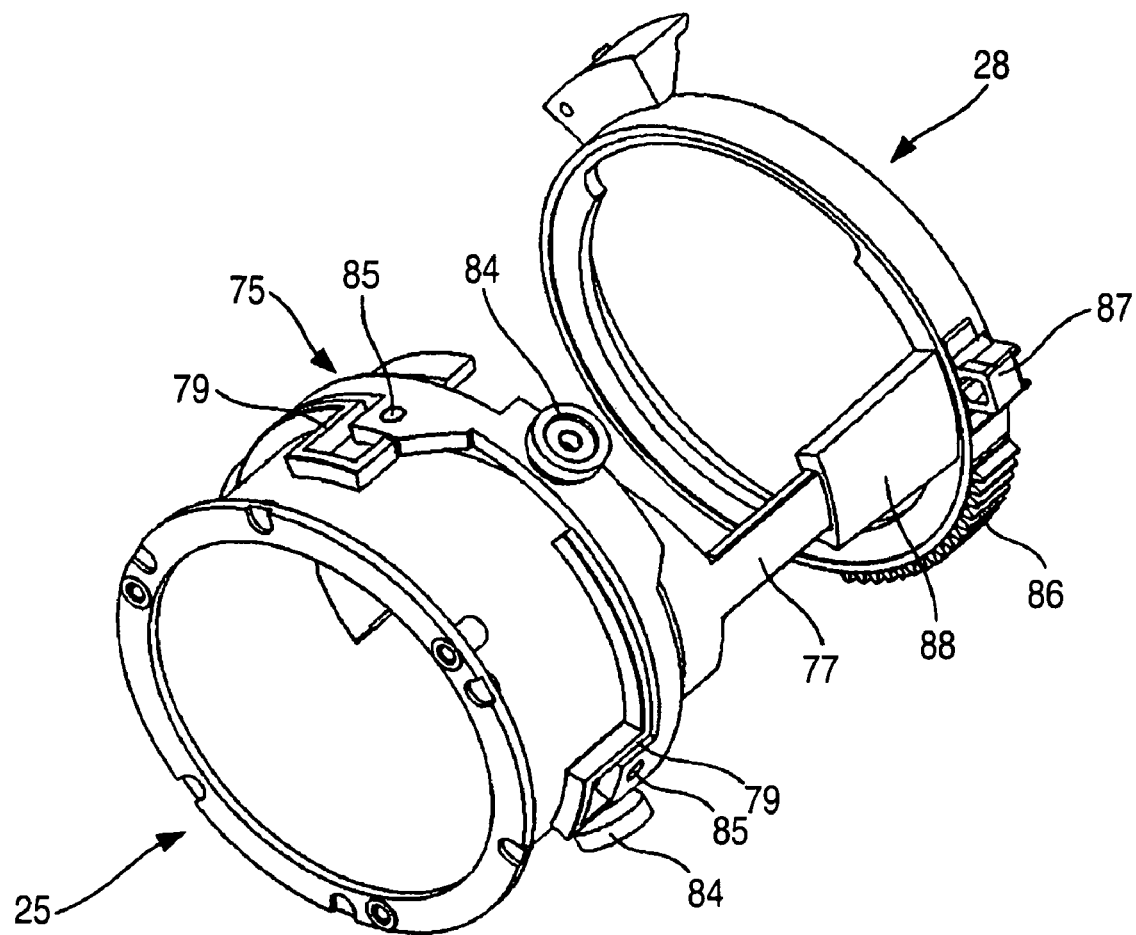
FIG. 26 shows the lens barrel according to an embodiment of the invention in a zooming operation, and is a perspective view in an infinity position (INF) on the telescopic side.
Figure 27A:
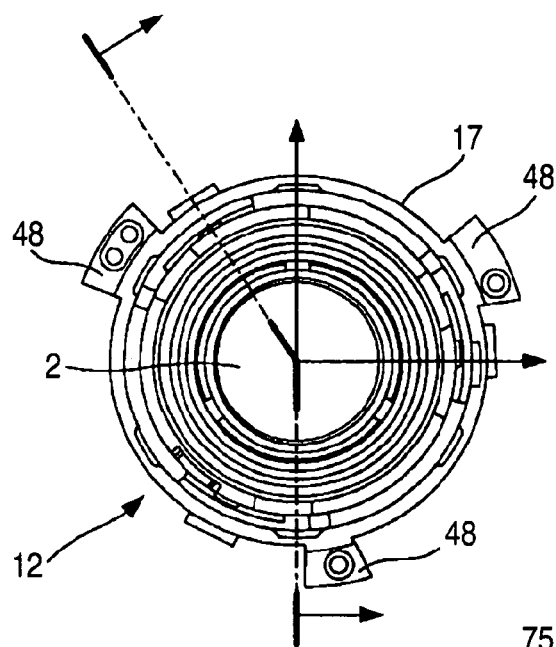
FIGS. 27A to 27C show the state in which a second lens group and other components in the lens barrel according to an embodiment of the invention are assembled.
Figure 27B:
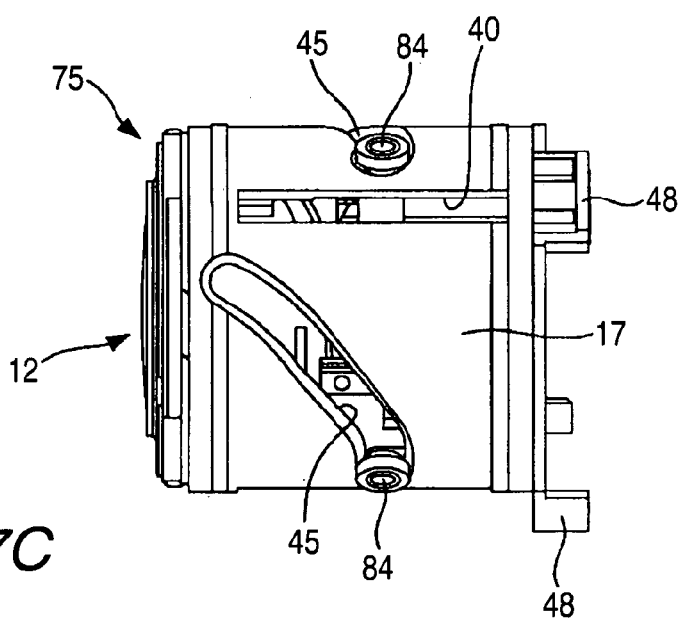
Figure 27C:
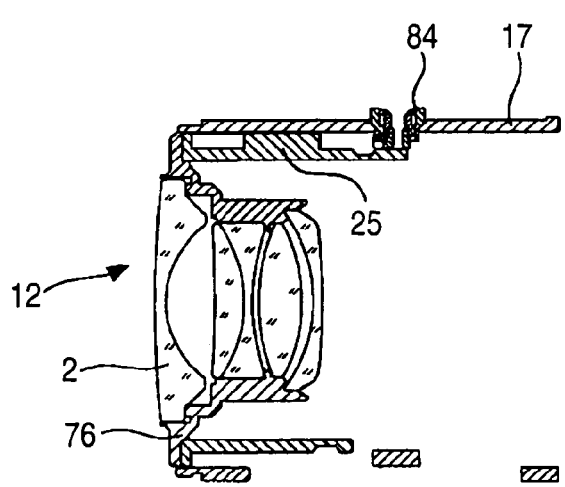
Figure 28A:
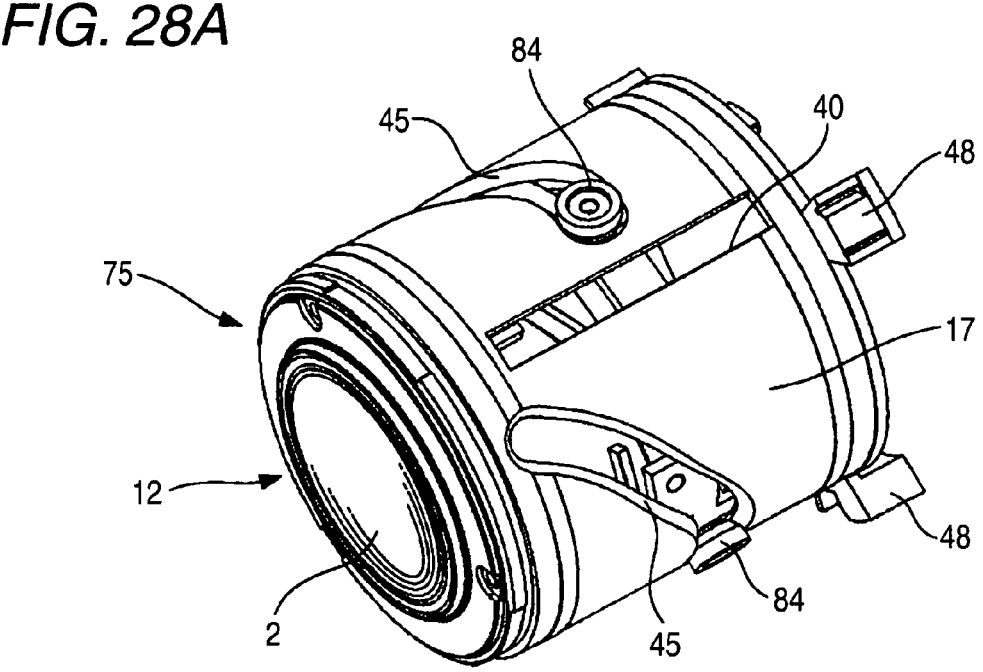
FIGS. 28A and 28B explain the positional relationship between the fixed tube and the focus cam ring in the lens barrel according to an embodiment of the invention.
Figure 28B:
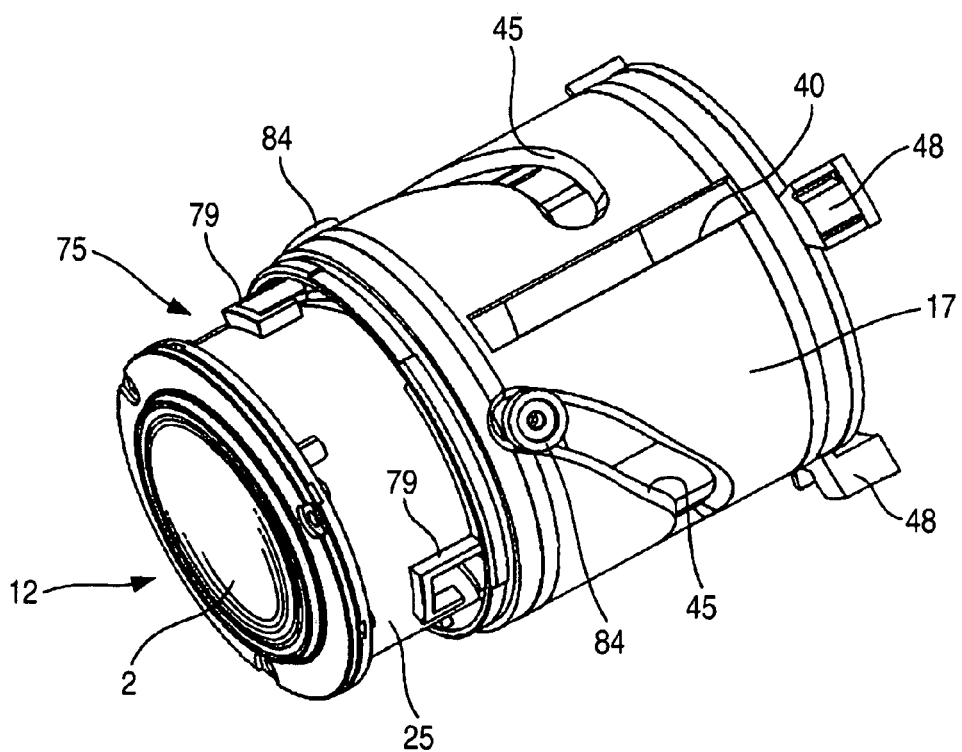
Figure 29A:
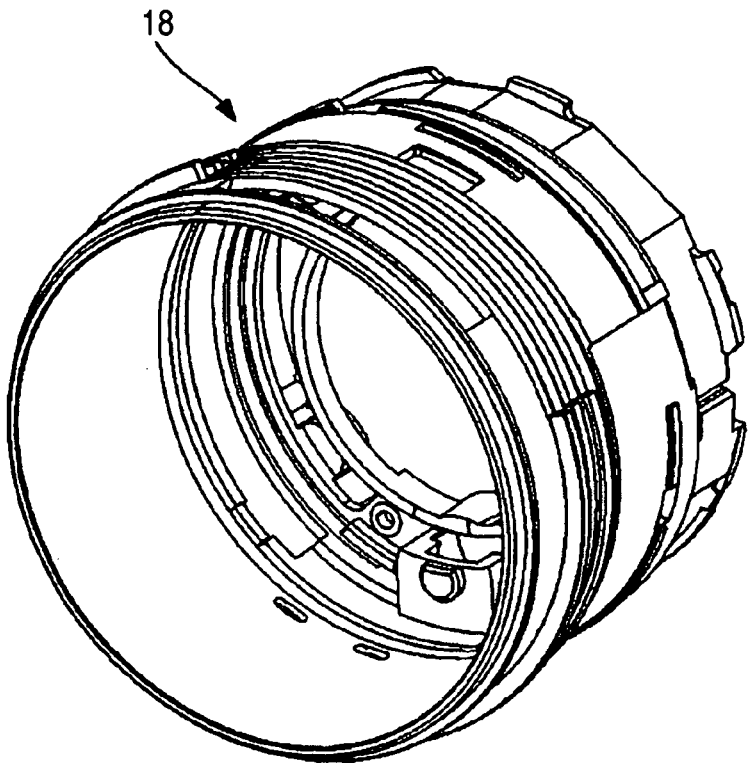
FIGS. 29A and 29B show a fixing and holding frame in the lens barrel according to an embodiment of the invention.
Figure 29B:
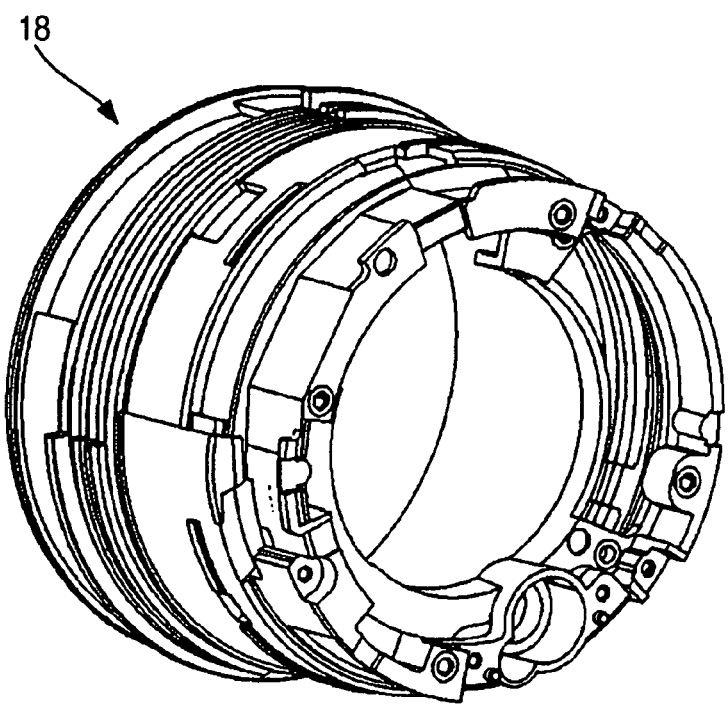
Figure 30:
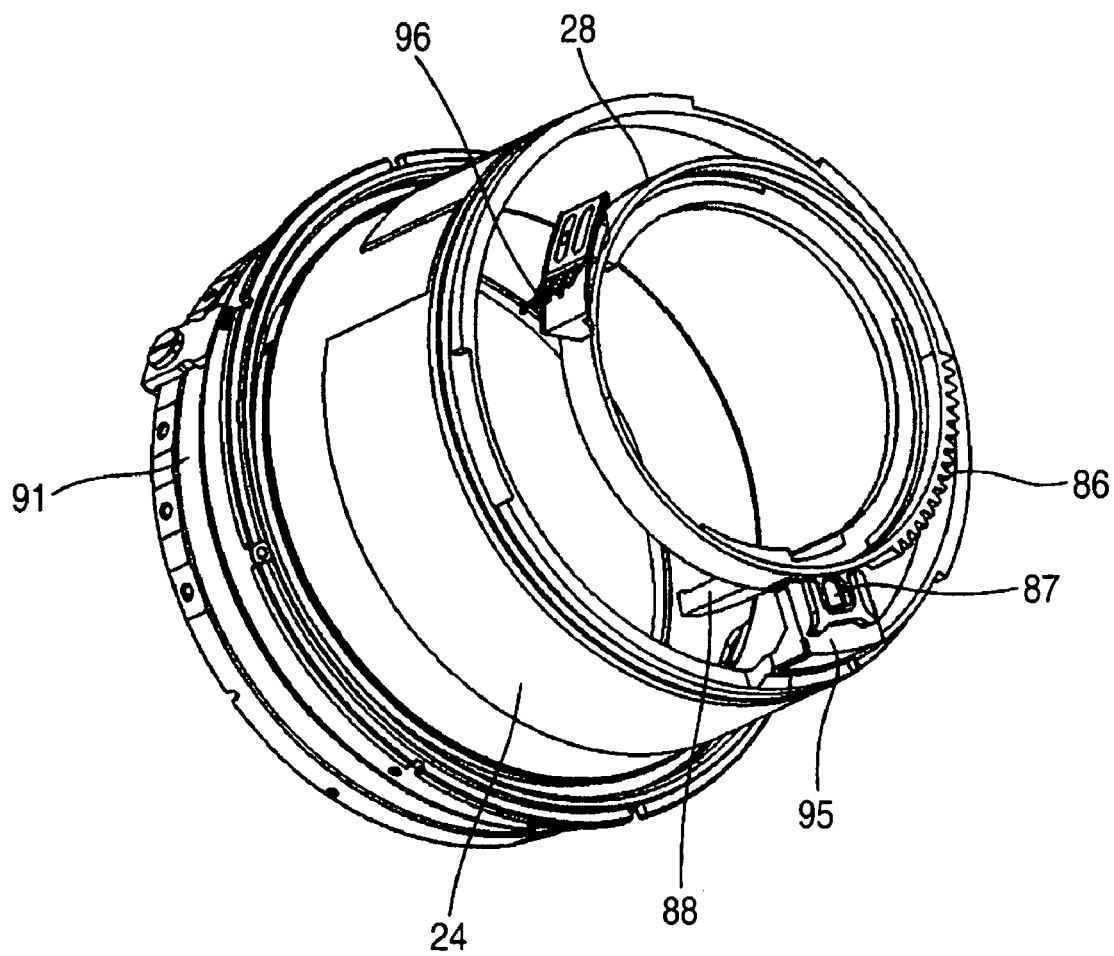
FIG. 30 is a perspective view of a focus actuation ring and other components in the lens barrel according to an embodiment of the invention.
Figure 31:
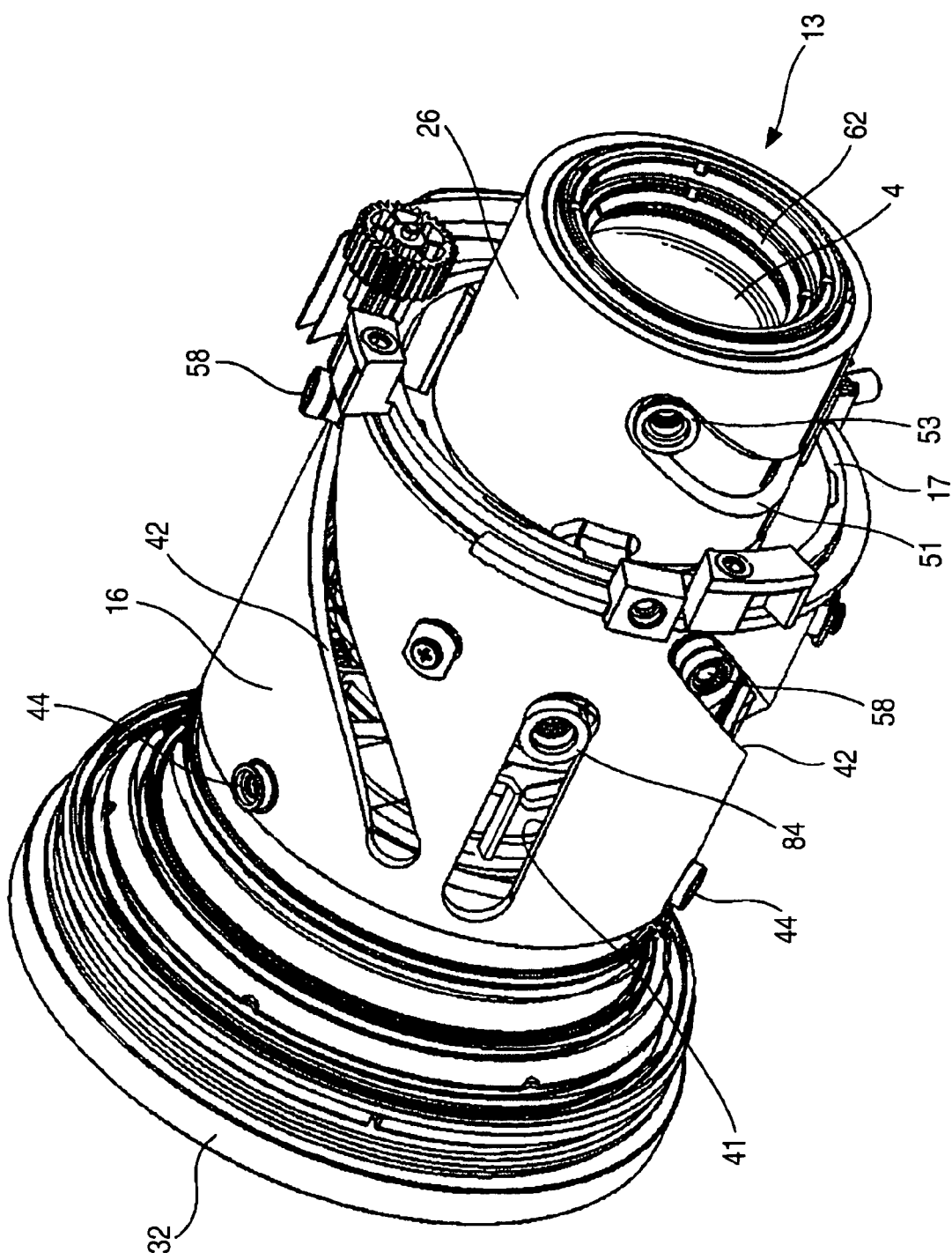
FIG. 31 is a perspective view showing the state in which the first-group cam ring, the fourth-group cam ring, and other components in the lens barrel according to an embodiment of the invention are assembled.
Figure 35:
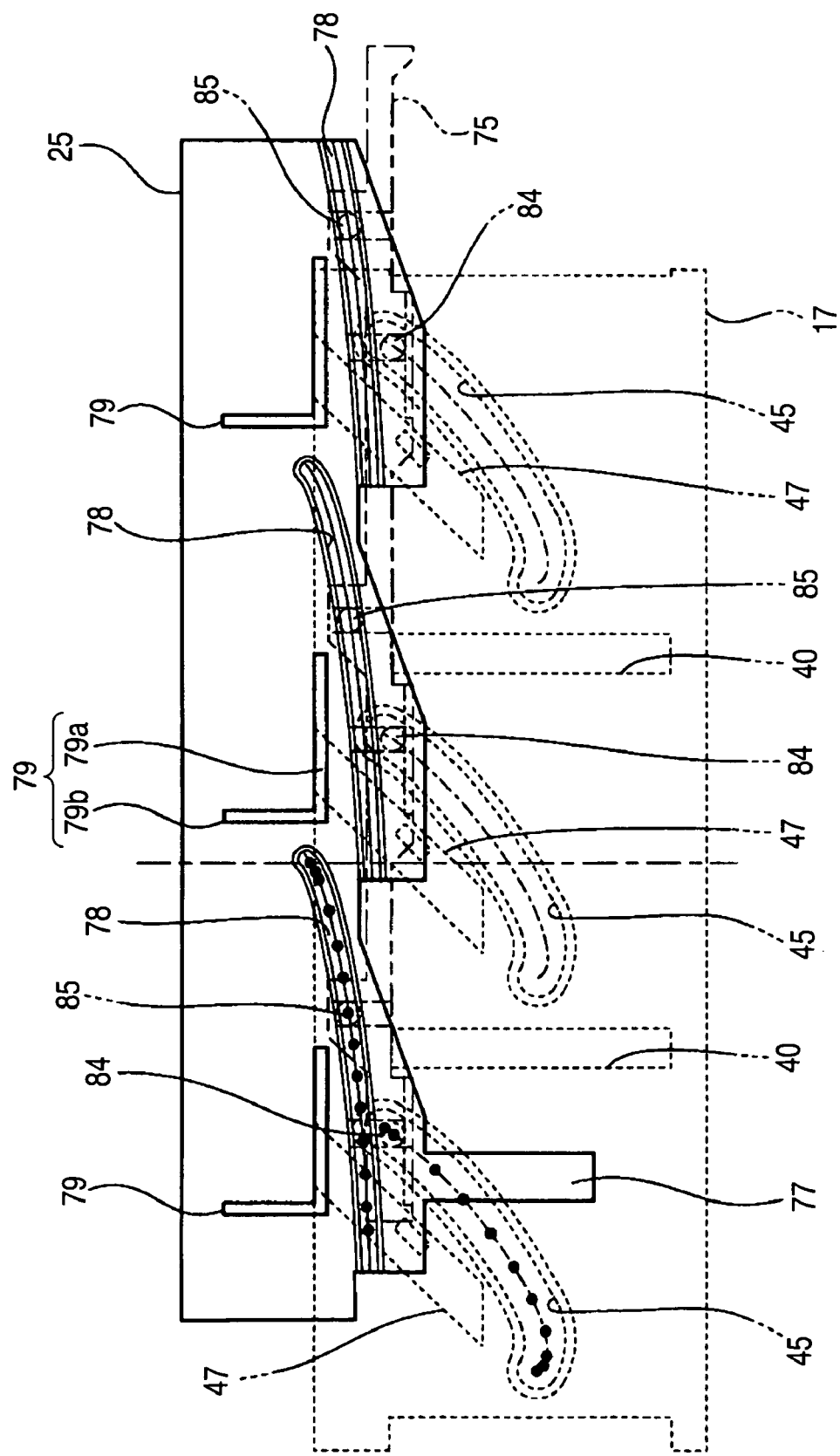
FIG. 35 explains the relationship among the actions of the fixed tube, the second-group moving frame, and the focus cam ring in the lens barrel according to an embodiment of the invention, and is the development in the near position (NEAR) on the telescopic side.
Figure 36:
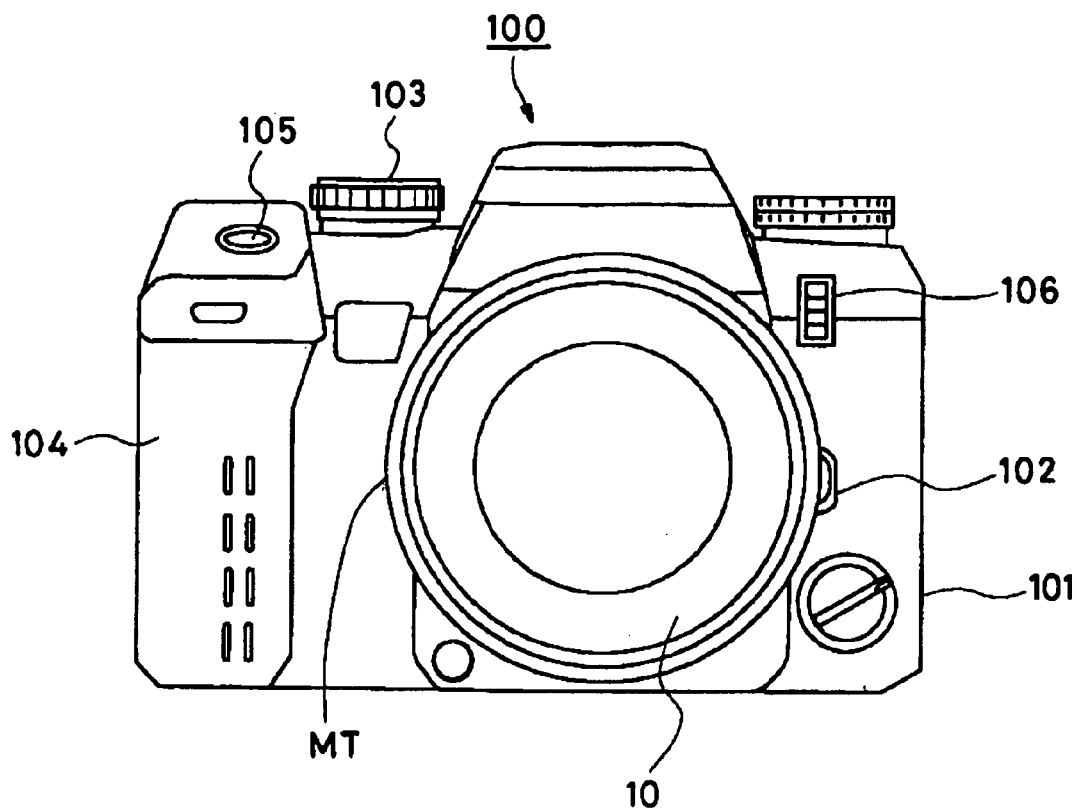
FIG. 36 is a front view of a digital single lens reflex camera showing a first example of an imaging apparatus using a lens barrel according to an embodiment of the invention.
Figure 37:
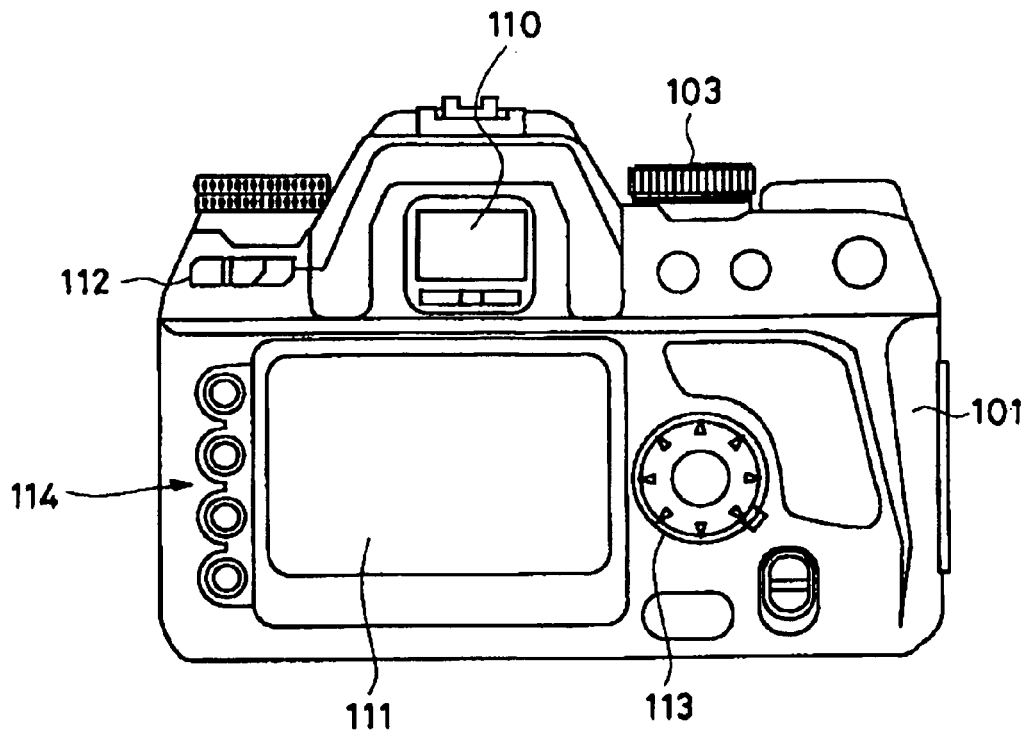
FIG. 37 is a rear view of the digital single lens reflex camera showing the first example of the imaging apparatus using a lens barrel according to an embodiment of the invention.
Figure 38:
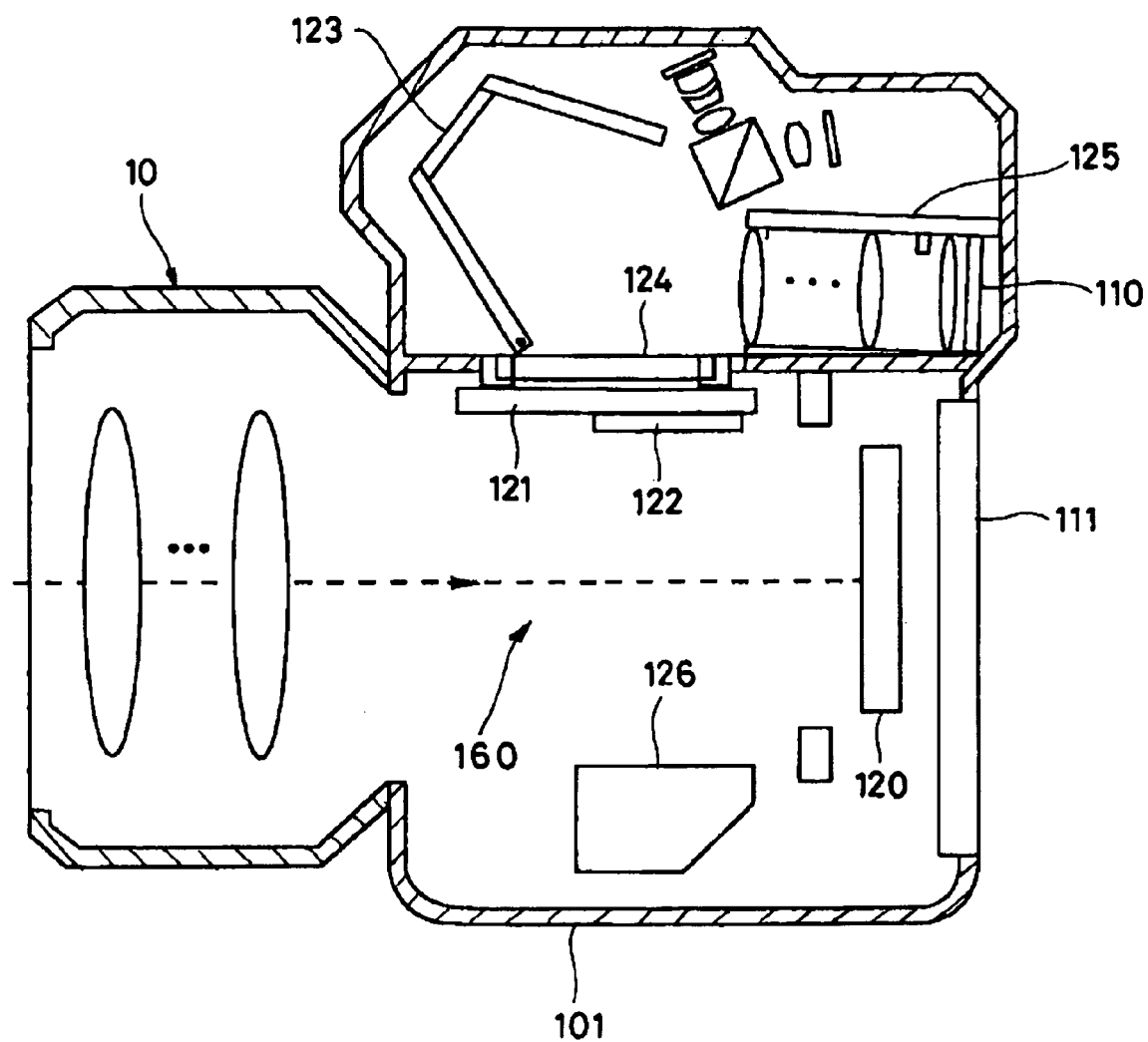
FIG. 38 is a longitudinal cross-sectional view of the digital single lens reflex camera showing the first example of the imaging apparatus using a lens barrel according to an embodiment of the invention.

An embodiment of the invention will be described with reference to the accompanying drawings. FIGS. 1 to 39 explain an example of the embodiment of the invention. That is, FIG. 1 is a cross-sectional view showing a first example of a lens barrel according to the embodiment of the invention. FIG. 2 is a perspective exploded view. FIGS. 3A and 3B are perspective views of a first-group frame. FIG. 4 is a perspective view of a first-group cam ring. FIG. 5 is a perspective view of a zoom cam ring. FIG. 6 is the development of the first-group cam ring. FIG. 7 is the development of the zoom cam ring. FIG. 8 is a perspective view of a fixed tube. FIG. 9 is a perspective view of a fourth-group cam ring. FIG. 10 is the development of the fixed tube. FIGS. 11A to 11D are descriptive diagrams showing examples of a lead groove of the fixed tube. FIG. 12 is the development of the fourth-group cam ring. FIG. 13 is the development of a third-group moving frame. FIG. 14 is a perspective view of a fourth-group frame unit. FIG. 15 is a perspective view of the third-group moving frame. FIG. 16A is an assembly diagram of the zoom cam ring and the fixed tube. FIG. 16B is an assembly diagram of the zoom cam ring, the fixed tube, and the fourth-group cam ring. FIG. 17 is a descriptive view showing connection between the fixed tube and a zooming operation ring. FIGS. 18A and 18B are perspective views of the zooming operation ring. FIG. 19 is the development of a first-group guide ring. FIG. 20 is a perspective view of a second-group frame assembly. FIG. 21 is a perspective view of a focus cam ring. FIG. 22 is a perspective view of a second-group moving frame. FIGS. 23A and 23B are the developments of the focus cam ring. FIG. 24 is the development of the second-group moving frame. FIGS. 25A, 25B and FIG. 26 are assembly diagrams of the focus cam ring and other components. FIGS. 27A to 27C are assembly diagrams of the fixed tube, the focus cam ring, and a second-group lens frame. FIGS. 28A and 28B are assembly diagrams of the focus cam ring, the fixed tube, and other components. FIGS. 29A and 29B are perspective views of a fixing and holding frame. FIG. 30 is a perspective view of a focus actuation ring and other components. FIG. 31 is a perspective, assembly diagram of the first-group cam ring, the fourth-group cam ring, and other components. FIGS. 32 to 35 are descriptive diagrams showing the relationship among the actions of the fixed tube, the second-group moving frame, and the focus cam ring. FIG. 36 is a front view of a single lens reflex camera showing a first example of an imaging apparatus with a lens barrel according to the embodiment of the invention. FIG. 37 is a rear view of the single lens reflex camera. FIG. 38 is a longitudinal cross-sectional view of the single lens reflex camera. FIG. 39 is a descriptive block diagram showing a schematic configuration of the single lens reflex camera.

A lens barrel 10 shown in FIGS. 1 and 2 is a first example of the lens barrel according to an embodiment of the invention, and configured as an interchangeable lens used, for example, in a digital single lens reflex camera. The lens barrel 10 includes an imaging optical system formed of a plurality of optical elements, such as lenses and filters, and a mechanical system formed of rings, frames, and other components that secure or movably support the components of the imaging optical system. The mechanical system may be manually operated or automatically driven by a drive mechanism, such as a motor and a gear.

As shown in FIG. 1, the imaging optical system of the lens barrel 10 has a four-group lens configuration including a first lens group 1 formed of a combination of a plurality of lenses, a second lens group 2 formed of a combination of a plurality of lenses, a third lens group 3 formed of a combination of one or more lenses, and a fourth lens group 4 formed of a combination of a plurality of lenses, the first to fourth lens groups disposed in this order from the subject side. Zooming and focusing capabilities can be provided by adjusting the positions of the second, third, and fourth lens groups 2, 3, 4, and zooming and focusing actions of the optical system can be carried out by moving the second to fourth lens groups 2 to 4 by predetermined amounts in the optical axis direction.

The mechanical system of the lens barrel 10 includes a first-group frame 11 that holds the first lens group 1, a second-group frame 12 that holds the second lens group 2, a third-group moving frame 13 that holds the third lens group 3, a fourth group frame unit 14 that holds the fourth lens group 4, a first-group cam ring 15, which is a specific example of a second cam tube, a zoom cam ring 16, which is a specific example of a first cam tube, a fixed tube 17, a fixing and holding frame 18, a first-group guide ring 21, a zooming operation ring 22, an exterior cover 23, a distance ring 24, and a focus cam ring 25. An imaging device formed of a CCD (Charge Coupled Device), a CMOS (Complementary Metal Oxide Semiconductor), or other devices is disposed behind the fourth lens group 4 in the lens barrel 10 in the optical axis direction.

The first-group frame 11 includes a tubular barrel ring 31 and a first-group lens frame 32 held in the barrel ring 31, as shown in FIG. 1 and FIGS. 3A, 3B. The barrel ring 31 is formed of a stepped tubular body, the diameter of one end of which in the tube axis direction is larger than that of the other end. The portion having the larger diameter is a large-diameter portion 31a, and the first-group lens frame 32 is detachably attached into the large-diameter portion 31a. The first-group lens frame 32 is formed of a frame body capable of holding a plurality of lenses, and the first lens group 1, which is formed of a combination of three lenses, is secured in the first-group lens frame 32. Three first-group cam pins 33 jutting inward in the radial direction and three detent raised portions 34 jutting outward in the radial direction are provided at the end of the barrel ring 31 that is opposite the large-diameter portion 31a. The three first-group cam pins 33 and the three detent raised portions 34 are respectively spaced apart at uniform angular intervals. The first-group cam pin 33 and the detent raised portion 34 adjacent to each other are disposed with an appropriate angle therebetween in the circumferential direction.

The first-group cam ring 15 is disposed in the barrel ring 31. The zoom cam ring 16 is disposed in the first-group cam ring 15. The fixed tube 17 is disposed in the zoom cam ring 16. The focus cam ring 25 is disposed in the fixed tube 17. The third-group moving frame 13 is disposed in the focus cam ring 25. A fourth-group cam ring 26, which is a specific example of a third cam tube, is disposed behind the barrel ring 31 in the optical axis direction and outside the focus cam ring 25. A light blocking tube 27 is disposed outside the fourth-group cam ring 26, and a focus actuation ring 28 is disposed outside the light blocking tube 27. The first-group guide ring 21 is disposed outside the barrel ring 31. The distance ring 24 is disposed outside the first-group guide ring 21. The zooming operation ring 22 and the exterior cover 23 are disposed outside the distance ring 24.

The first-group cam ring 15 is formed of a thin-walled tubular body, and has three axial grooves 36, three circumferential grooves 37, and three zoom cam grooves 38, the grooves cutting through the wall and being open on both sides thereof, as shown in FIGS. 2 and 4. As shown in FIG. 6, the three axial grooves 36 extend parallel to one another in the tube axis direction and are spaced apart at predetermined intervals. The three circumferential grooves 37 extend in the circumferential direction and are spaced apart at predetermined intervals on one side of the first-group cam ring 15 in the tube axis direction. Each of the three zoom cam grooves 38 linearly extends between adjacent axial grooves 36, 36 in a diagonal direction from one end of one of the adjacent axial grooves 36 to the other end of the other one of the adjacent axial grooves 36.

The zoom cam ring 16 is formed of a thin-walled tubular body, and has three elongated translational guide grooves 41 and three elongated rotational guide grooves 42, the grooves cutting through the wall and being open on both sides thereof, as shown in FIGS. 2 and 5. As shown in FIG. 7, the three elongated translational guide grooves 41 extend parallel to one another in the tube axis direction and are spaced apart at predetermined intervals. The three elongated rotational guide grooves 42 extend between adjacent elongated translational guide grooves 41, 41 in a diagonal direction from the vicinity of one end of one of the adjacent elongated translational guide grooves 41 to the other end of the other one of the adjacent elongated translational guide grooves 41 along an S-shaped gently curved line. One end of each of the elongated translational guide grooves 41 and the elongated rotational guide grooves 42 is formed to have a slightly larger diameter, so that a cam pin or any other element is readily inserted therein.

The zoom cam ring 16 further has an outer flange 16a formed at one end in the tube axis direction and jutting outward in the radial direction and an inner flange 16b formed at the other end in the tube axis direction and jutting inward in the radial direction. Zoom synchronized pins 43 jutting outward in the radial direction are provided in two positions on the outer flange 16a of the zoom cam ring 16. The two zoom synchronized pins 43, 43 are spaced apart at a predetermined angular interval (120 degrees in the example) in the circumferential direction. Three connecting cam pins 44 jutting outward in the radial direction are provided on the inner flange 16b side of the zoom cam ring 16. The three connecting cam pins 44, 44 are spaced apart at uniform angular intervals in the circumferential direction. The three connecting cam pins 44, 44 slidably engage the three zoom cam grooves 38, 38 of the first-group cam ring 15.

The fixed tube 17 is formed of a thin-walled tubular body, and has three translational guide grooves 40 and three cam grooves 45 that cut through the wall and are open on both sides thereof, one lead groove 46 that is open only on the inner side of the wall, and three fitting raised portions 47 jutting inward, as shown in FIGS. 2 and 8. As shown in FIG. 10, the three translational guide grooves 40 extend parallel to one another in the tube axis direction and are spaced apart at predetermined intervals. Each of the three cam grooves 45 extends between adjacent translational guide grooves 40, 40 from an intermediate portion of one of the adjacent translational guide grooves 40 to the other end of the other one of the adjacent translational guide grooves 40 along an arc-shaped curve.

Each of the fitting raised portions 47 is disposed on the concave side of each of the cam grooves 45 of the fixed tube 17. Each of the fitting raised portions 47 is formed as a projecting stripe that is inclined to the corresponding translational guide groove 40 by a predetermined angle (45 degrees in the example) and helically extends to an intermediate portion of the translational guide groove 40. The inner surface of the fitting raised portion 47 is formed to be substantially parallel to the tube axis center line of the fixed tube 17. The lead groove 46 is formed as an elongated groove that faces one of the fitting raised portions 47, is open on the side opposite the fitting raised portion 47 of the fixed tube 17, inclined to the translational guide groove 40 by a predetermined angle (45 degrees in the example), and helically extends to an intermediate portion of the translational guide groove 40.

The lead groove 46 of the fixed tube 17 guides the fourth-group cam ring 26 and slidably engages an engaging projection 26a of the fourth-group cam ring 26, which will be described later. The number of rotations of the fourth-group cam ring 26 can be adjusted by changing, for example, the inclination angle of the lead groove 46.

Figure 11A:
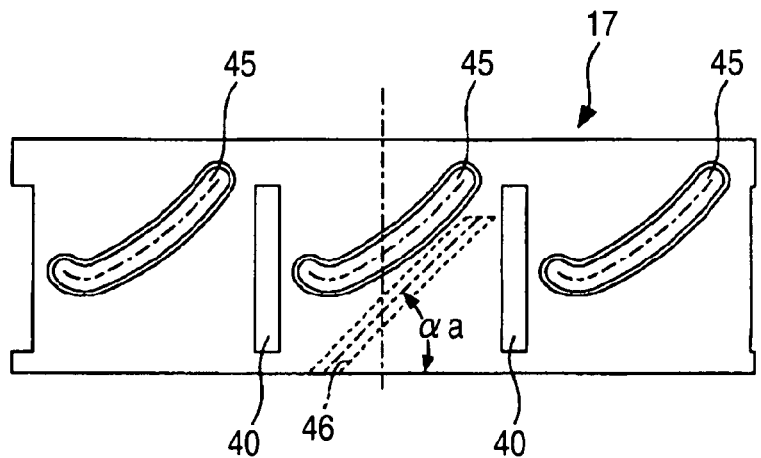
FIGS. 11A to 11D show examples of a lead groove among the cam grooves and other portions of the fixed tube in the lens barrel according to an embodiment of the invention.
Figure 11B:
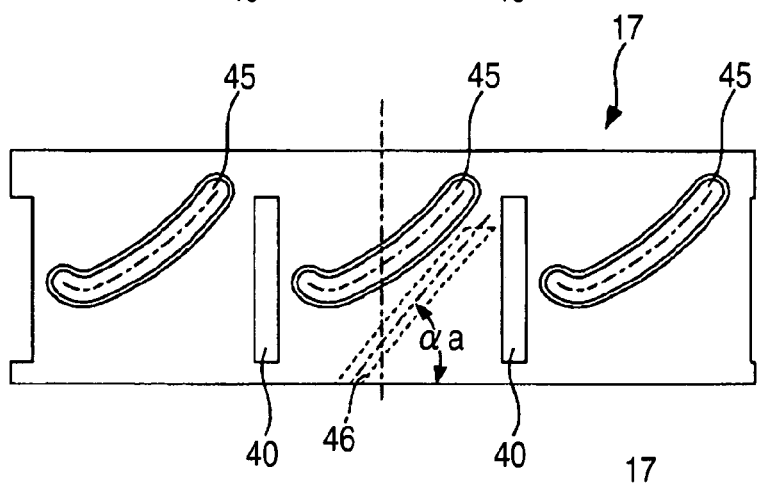
Figure 11C:
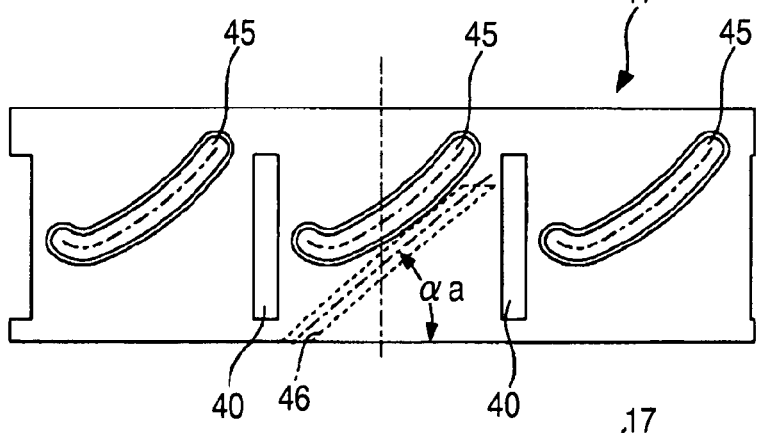
Figure 11D:
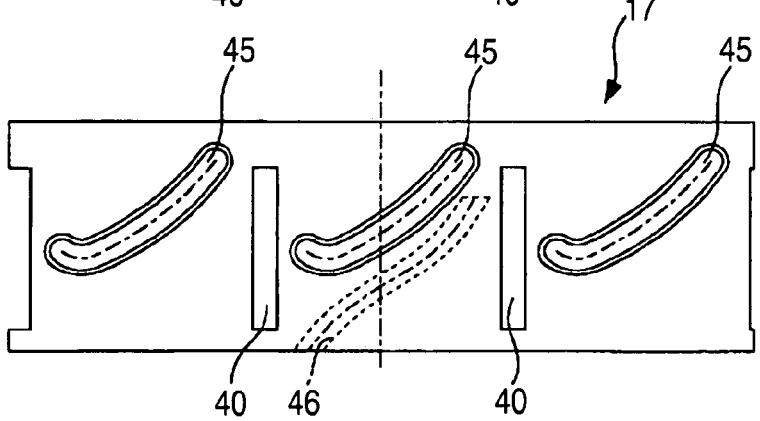

FIGS. 11A to 11D show variations of the inclination angle of the lead groove 46. In FIG. 11A, the inclination angle α of the lead groove 46 is normally set as shown in FIG. 10 and other figures. The inclination angle α of the lead groove 46 in FIG. 11A is defined as a reference inclination angle αa (45 degrees in the example). In FIG. 11B, the inclination angle α of the lead groove 46 is steeper than the normally set inclination angle and defined as an inclination angle αb. In this case, the amount of rotation of the fourth-group cam ring 26 can be smaller. In FIG. 11C, the inclination angle α of the lead groove 46 is gentler than the normally set inclination angle, and defined as an inclination angle αc. In this case, the amount of rotation of the fourth-group cam ring 26 can be greater. In FIG. 11D, the inclination of the lead groove 46 follows a substantially S-shaped cam curve. In this case, the amount of rotation of the fourth-group cam ring 26 can be increased and decreased within a single stroke.

Three connecting arms 48 jutting outward in the radial direction are further provided at the end where the lead groove 46 of the fixed tube 17 is open. The three connecting arms 48 are spaced apart at predetermined uniform angular intervals in the circumferential direction. The fixed tube 17 is rotatably connected to the zoom cam ring 16 via a bayonet, and the zoom cam ring 16 is rotated by rotating the zooming operation ring 22.

The fourth-group cam ring 26 is formed of a thin-walled tubular body, and has two fourth-group cam grooves 51 cutting through the wall and being open on both sides thereof, two substantially L-shaped fourth-group auxiliary cam grooves 52 only being open on the inner side of the wall, and the engaging projection 26a described above, as shown in FIG. 9. As shown in FIG. 12, the two fourth-group cam grooves 51, 51 are spaced apart at predetermined intervals in the circumferential direction and extend along an arc in the circumferential direction in such a way that each of the fourth-group cam grooves 51, 51 has a concave shape on one side in the tube axis direction. Each of the two fourth-group auxiliary cam grooves 52, 52 is disposed between adjacent fourth-group cam grooves 51, 51, and has an axial groove 52a that extends in the tube axis direction and is open at one end, a circumferential groove 52b that is connected to the inner end of the axial groove 52a and extends in the circumferential direction, and a curved groove 52c that is located at the tip of the circumferential groove 52b and curved in the axial direction.

Two fourth-group cam pins 53, 53 slidably engage the two fourth-group cam grooves 51, 51 of the fourth-group cam ring 26. The two fourth-group cam pins 53, 53 are disposed in positions spaced apart by 180 degrees and pass through two fourth-group translational guide grooves 54, 54 of the third-group moving frame 13. The two fourth-group cam pins 53, 53 connect the fourth-group frame unit 14 to the fourth-group cam ring 26 in such a way that the fourth-group frame unit 14 is moved in synchronization with the fourth-group cam ring 26 via the third-group moving frame 13.

The fourth-group frame unit 14 includes a fourth-group moving frame 61 formed of a cylindrical tubular body and a fourth-group lens frame 62 held in the fourth-group moving frame 61, as shown in FIGS. 1 and 14. The fourth-group lens frame 62 is formed of a frame body capable of holding a plurality of lenses, and the fourth lens group 4, which is formed of a combination of five lenses, is secured in the fourth-group lens frame 62. Further, the two fourth-group cam pins 53, 53 are attached to the outer circumferential surface of the fourth-group moving frame 61 in positions spaced apart by 180 degrees.

The third-group moving frame 13 has a configuration shown in FIGS. 1 and 15. That is, the third-group moving frame 13 is formed of a thin-walled tubular body and has the two fourth-group translational guide grooves 54, 54 and two fourth-group auxiliary cam pins 55, 55. FIG. 13 is the development of the third-group moving frame 13. The two fourth-group translational guide grooves 54, 54 are spaced apart at predetermined intervals in the circumferential direction and extend parallel to the tube axis direction, and each of the fourth-group auxiliary cam pins 55 is disposed in the vicinity of each of the fourth-group translational guide grooves 54.

An inner flange 13a jutting inward in the radial direction is provided at one end of the third-group moving frame 13 in the tube axis direction. A third-group lens frame 56 is secured to the inner flange 13a. The third-group lens frame 56 is formed of a frame body capable of holding a plurality of lenses, and the third lens group 3, which is formed of a combination of two lenses, is secured in the third-group lens frame 56. A third-group extension ring 57 is detachably attached to the tip of the third-group moving frame 13.

Three third-group pins 58 are further provided on the outer circumferential surface of the third-group moving frame 13 on the inner flange 13a side in such a way that they are spaced apart at uniform intervals in the circumferential direction. Each of the third-group pins 58 is formed of two rollers 58a, 58b and an attachment screw 59 that passes through the two rollers 58a, 58b and rotatably supports them on the third-group moving frame 13. The two rollers 58a, 58b are layered on each other. The first roller 58a engages the fixed tube 17 and the zoom cam ring 16, and the second roller 58b engages the first-group cam ring 15 and the first-group guide ring 21. The second rollers 58b of the three third-group pins 58 slidably engage the three circumferential grooves 37 of the first-group cam ring 15.

FIG. 16A shows the state in which the fixed tube 17 fits in the zoom cam ring 16 and is combined therewith. The fixed tube 17 is inserted into the zoom cam ring 16, and two of the three connecting arms 48, 48 provided on the fixed tube 17 are disposed in the vicinity of the two zoom synchronized pins 43, 43 provided on the outer flange 16a of the zoom cam ring 16. FIG. 16B shows the state in which the fourth-group cam ring 26 fits in the assembly of the zoom cam ring 16 and the fixed tube 17 and is combined therewith. The engaging projection 26a of the fourth-group cam ring 26 slidably engages the lead groove 46 of the fixed tube 17.

FIG. 17 is a descriptive diagram showing the connection among the zoom cam ring 16, the fixed tube 17, and the zooming operation ring 22. As shown in FIG. 1 and FIGS. 18A, 18B, the zooming operation ring 22 is formed of a tubular body with a recess in an intermediate portion in the tube axis direction, and a zoom rubber ring 65 fits on the outer circumferential surface of the small-diameter portion. The outer circumferential surface of the zoom rubber ring 65 is knurled to form an anti-slip portion, and the zooming operation ring 22 is pivoted by holding and rotating the zoom rubber ring 65. Pin holders 66 for engaging and holding the zoom synchronized pins 43 of the zoom cam ring 16 are provided on the inner circumferential surface of the zooming operation ring 22.

A rear holding ring 67 is provided on the rear side of the zooming operation ring 22 in the optical axis direction OL. A lens mount 68 is fixed to the rear holding ring 67, and the lens barrel 10 is detachably attached to an imaging apparatus, such as a single lens reflex camera, via the lens mount 68. The exterior cover 23 is disposed on the front side of the zooming operation ring 22 in the optical axis direction OL. A distance scale window 69 for looking inside the lens barrel 10 is provided in the exterior cover 23. The distance to a subject can be visually recognized by looking the scale inside the lens barrel 10 through the distance scale window 69.

FIG. 19 is the development of the first-group guide ring 21. The first-group guide ring 21 is formed of a thin-walled tubular body, and has three axial guide grooves 71 that are open only at the outer surface of the wall and three fitting holes 72 that pass through the wall and bosses jutting inward. The three axial guide grooves 71 are spaced apart at uniform intervals in the circumferential direction and extend parallel to the tube axis direction in the outer circumferential surface of the first-group guide ring 21. Further, the three axial guide grooves 71 are open only at one end of the first-group guide ring 21 in the tube axis direction, and the three fitting holes 72 are provided on the side opposite the openings and similarly spaced apart at uniform intervals in the circumferential direction. The second rollers 58b of the three third-group pins 58 respectively fit in the three fitting holes 72.

FIG. 20 shows the assembly of the second-group frame 12. The second-group frame assembly 74 includes the second-group frame 12, the focus cam ring 25, and a second-group moving frame 75. The second-group frame 12 includes a second-group lens frame 76 formed of a frame body capable of holding a plurality of lenses and the second lens group 2 formed of a combination of five lenses held in the second-group lens frame 76.

The focus cam ring 25 has a configuration shown in FIG. 21. That is, the focus cam ring 25 has a thin-walled tubular body, and an outer flange 25a jutting outward in the radial direction is provided at one end of the focus cam ring 25 in the tube axis direction. The outer flange 25a secures the second-group frame 12 to the focus cam ring 25 using screws. A focus synchronized lever 77 that extends toward the rear and juts out parallel to the tube axis direction is provided at the other end of the focus cam ring 25 in the tube axis direction. The focus actuation ring 28 is connected to the focus synchronized lever 77.

The focus cam ring 25 further includes three variator cams 78 and three L-shaped position restrictors 79, as shown in the developments of FIGS. 23A and 23B. Three sawtoothed cutouts 81 are provided at one end of the focus cam ring 25 in the tube axis direction and spaced apart at uniform intervals in the circumferential direction. Each of the cutouts 81 includes a vertical portion 81a extending parallel to the tube axis direction, a horizontal portion 81b connected to the bottom of the vertical portion 81a and extending in the horizontal direction, and an inclined portion 81c connected to the other end of the horizontal portion 81b and extending in a diagonal direction toward the one end.

One end of the variator cam 78 is open at the vertical portion 81a of the cutout 81, and the variator cam 78 is curved further away from the cutout 81 as the rotation angle advances. Each of the variator cams 78 is set to have a rotation angle of 120 degrees or larger, which is larger than one-third the circumferential length of the focus cam ring 25. Therefore, the tip of each of the variator cams 78 extends to (overlaps) a position located beyond the vertical portion 81a of the adjacent cutout 81. In FIGS. 23A and 23B, the reference characters WI, WN, TI, and TN denote an infinite position on the wide-angle side, a near position on the wide-angle side, an infinite position on the telescopic side, and a near position on the telescopic side, respectively.

Each of the three position restrictors 79 is provided in the position corresponding to an intermediate portion of the corresponding one of the three variator cams 78. The position restrictor 79 includes a horizontal portion 79a facing the inclined portion 81c of the variator cam 78, a vertical portion 79b connected to the end of the horizontal portion 79a that is on the vertical portion 81a side of the cutout 81, and a reinforcing rib 79c connected to the far end of the vertical portion 79b from the cutout 81. The horizontal portion 79a of the position restrictor 79 extends in the circumferential direction on a plane perpendicular to the tube axis direction. The horizontal portion 79a is located in substantially the same position as the tip of the variator cam 78 in the tube axis direction of the focus cam ring 25. The vertical portion 79b of the position restrictor 79 extends in the direction parallel to the tube axis direction. The horizontal portion 79a and the vertical portion 79b form the substantial part of the position restrictor 79 and prevent the focus cam ring 25 from dropping off, as will be described later.

The reinforcing rib 79c of the position restrictor 79 is a reinforcing member that reinforces the focus cam ring 25 to prevent deformation. The reinforcing rib 79c may be omitted when the focus cam ring 25 is strong enough not to be deformed since the reinforcing rib 79c does not function as a receiving member like the horizontal portion 79a and the vertical portion 79b.

The second-group moving frame 75 has a configuration shown in FIG. 22. That is, the second-group moving frame 75 is formed of a ring-shaped frame body. The second-group moving frame 75 has three second-group cam pins 84 and three focus cam pins 85. The three second-group cam pins 84 are spaced apart at uniform angular intervals in the circumferential direction and jut outward in the radial direction. Each of the second-group cam pins 84 includes a roller 84a that rotatably and slidably engages the corresponding cam groove 45 of the fixed tube 17 and an attachment screw 84b that rotatably supports the roller 84a on the second-group moving frame 75.

FIG. 24 is the development of the second-group moving frame 75. The three focus cam pins 85 are spaced apart at uniform angular intervals in the circumferential direction and jut inward in the radial direction. The head of each of the focus cam pins 85 is tapered (has a mushroom shape), and slidably engages the corresponding one of the three variator cams 78 of the focus cam ring 25.

FIGS. 25A, 25B, and 26 explain the assembled focus cam ring 25, second-group moving frame 75, and focus operation ring 28. FIG. 25A corresponds to the infinity position on the wide-angle side. FIG. 25B corresponds to the near position on the wide-angle side. FIG. 26 corresponds to the infinity position on the telescopic side. The focus operation ring 28 has a ring-shaped body, and a gear 86 and an engaging projection 87 are provided on part of the outer circumferential surface of the body. The gear 86 transmits an autofocus drive force. A slide bearing 88 jutting out in the tube axis direction is provided at one end of the body of the focus operation ring 28. The slide bearing transmits a drive force created in a manual focusing operation. The slide bearing holds the focus synchronized lever 77 provided on the focus cam ring 25 in such a way that the focus synchronized lever 77 can slide in the tube axis direction.

FIGS. 27A, 27B, 27C and FIGS. 28A, 28B show the fixed tube 17 assembled to the second-group frame assembly 74. The second-group cam pins 84 of the second-group moving frame 75 slidably engage the cam grooves 45 of the fixed tube 17. FIGS. 27A, 27B, 27C and FIG. 28A show a retracted second-group moving frame 75, and FIG. 28B shows a pushed-out second-group moving frame 75.

FIGS. 29A and 29B show the fixing and holding ring 18. The fixing and holding ring 18 is formed of a tubular member, and the zooming operation ring 22 pivotably fits on the outer surface of the fixing and holding ring 18.

FIG. 30 explains the state in which the focus operation ring 28, the distance ring 24, and a clutch unit 91 are assembled. The clutch unit 91 is disposed outside the first-group guide ring 21 and in front of the fixing and holding ring 18 and the distance ring 24, as shown in FIG. 1. A focus operation ring 92 is disposed in front of the clutch unit 91. A focus rubber ring 93 is attached to the focus operation ring 92. The clutch unit 91 rotates the focus operation ring 92 and other components, and is configured in such a way that rotation of the focus operation ring 92 rotates the distance ring 24 but rotation of the distance ring 24 does not rotate the focus operation ring 92.

The engaging projection 87 of the focus operation ring 28 movably engages and holds a connecting arm 95 provided on the distance ring 24. Further, a focus brush 96 is attached to the focus operation ring 28. The focus brush 96 in contact with an encoder (not shown) rotates and transmits an electric signal. FIG. 31 explains the assembled zoom cam ring 16 and third-group moving frame 13.

The action of the thus configured lens barrel 10 will be described below. First, there follows a description of the operation when the zooming operation ring 22 is rotated in the zooming operation.

When the zooming operation ring 22 is rotated, the rotational force is transmitted through the zoom synchronized pins 43 to the zoom cam ring 16, which is rotated accordingly. When the zoom cam ring 16 is rotated, the third-group moving frame 13 is moved forward without being rotated by the third-group pins 58 that follow the translational guide grooves 40 of the fixed tube 17 and the elongated rotational guide grooves 42 of the zoom cam ring 16. The rotational force of the zoom cam ring 16 is transmitted to the first-group cam ring 15 via the connecting cam pins 44 (which engage the translational guide grooves 40 of the first-group cam ring 15) attached to the front end of the zoom cam ring 16.

Since the third-group pins 58 are inserted into the circumferential grooves 37 of the first-group cam ring 15, the first-group cam ring 15 moves forward, while rotating, at the same speed as the third-group moving frame 13. The detent raised portions 34 and the translational guide groove of the barrel ring 31 prevent the first-group frame 11 from rotating, and the cam groove 38 of the first-group cam ring 15 push forward the first-group cam pins 33. In this way, the first-group cam ring 15, which moves forward as described above, further travels a long distance.

Since the fourth-group auxiliary cam grooves 52, which engage the fourth-group auxiliary cam pins 55, are formed in the inner surface of the fourth-group cam ring 26, the fourth-group cam ring 26 travels forward when the third-group moving frame 13 travels forward. The fourth-group cam ring 26 rotates while traveling forward, because the engaging projection 26a of the fourth-group cam ring 26 engages the lead groove 46 of the fixed tube 17. That is, the fourth-group cam ring 26 rotates at a speed different from those of the zoom cam ring 16 and the first-group cam ring 15 and travels forward at a speed different from that of the third-group moving frame 13. Therefore, providing the lead groove 46 and the fourth-group auxiliary cam grooves 52 allows the rotation speed and the travel speed of the fourth-group cam ring 26 to be arbitrarily set, whereby significantly greater freedom of cam design is achieved.

The fourth-group frame unit 14 travels forward when the fourth-group cam pins 53 are moved by the fourth-group cam grooves 51 formed in the fourth-group cam ring 26 along the fourth-group translational guide grooves 54 formed in the third-group moving frame 13 as a translational guide, as shown in FIG. 14. That is, the fourth-group frame unit 14 travels an extra length corresponding to the fourth-group cam grooves 51 relative to the fourth-group cam ring 26.

The second-group moving frame 75 travels forward while rotating along the cam grooves 45 formed in the fixed tube 17 when the elongated translational guide grooves 41 of the zoom cam ring 16 rotate the second-group cam pins 84. The focus cam ring 25 does not rotate because the focus synchronized lever 77 restricts the rotation, but the second-group moving frame 75 rotates and travels forward. Therefore, the focus cam ring 25 travels forward along with the second-group moving frame 75 and further travels forward due to the change in the positions at which the variator cams 78 are in contact with the second-group cam pins 84. That is, the focus cam ring 25 is moved to a predetermined position corresponding to the sum of the amount of travel of the second-group moving frame 75 caused by the cam grooves 45 and the amount of travel caused by the variator cams 78.

The amount of travel and the rotation speed of each part in the zooming operation are summarized as follows:

Zoom cam ring 16: Not traveling but rotating at the same speed as that of the zooming operation ring 22

Third-group moving frame 13: Traveling at a speed determined by the elongated rotational guide grooves 42 but not rotating First-group cam ring 15: Traveling at the same speed as that of the third-group moving frame 13 and rotating at a different speed than that of the zoom cam ring 16

First-group frame 11: Traveling at a speed determined by the cam grooves 38 and the elongated rotational guide grooves 42 but not rotating Fourth-group cam ring 26: Traveling at a speed determined by the elongated rotational guide grooves 42 and the fourth-group auxiliary cam grooves 52, and rotating at a speed determined by the lead groove 46 and the traveling speed of the fourth-group cam ring 26 itself Fourth-group frame unit 14: Traveling at a speed determined by the elongated rotational guide grooves 42, the fourth-group cam grooves 51 and the fourth-group auxiliary cam grooves 52 but not rotating Second-group moving frame 75: Traveling at a speed determined by the cam grooves 45 and rotating at the same speed as that of the zooming operation ring 22

Focus cam ring 25: Traveling at a speed determined by the cam grooves 45 and the variator cams 78 but not rotating A description will be made of the action of the lens barrel 10 when the focus operation ring 92 is rotated in the focusing operation.

When the focus operation ring 92 is rotated, the distance ring 24 is rotated via the clutch unit 91. When the distance ring 24 is rotated, the focus actuation ring 28 to which the connecting arm 95 is connected is rotated. When the focus actuation ring 28 is rotated, the focus cam ring 25 is rotated via the focus synchronized lever 77. When the focus cam ring 25 is rotated, the currently used positions of the variator cams 78 change, and the focus cam ring 25 moves in the optical axis direction. The example has been described with reference to the case where the variator cams 78 are provided in the focus cam ring 25 and the cam pins are provided on the second-group moving frame 75. In contrast to this configuration, it is of course conceivable that the cam pins are provided on the focus cam ring 25 and the variator cams 78 are provided in the second-group moving frame 75.

Restriction of the position of the focus cam ring 25 will be described below.

The focus cam ring 25 is supported by the second-group moving frame 75 via the three focus cam pins 85, as shown in FIGS. 20, 25, and 26. The three focus cam pins 85 primarily serve to produce no tilt component (the component inclined to the plane perpendicular to the optical axis) of the focus cam ring 25.

Now assume a perfectly ideal shape that produces no play component. Since the focus cam pin 85 is a tapered (mushroom-shaped) pin, no shift component (the component parallel to the plane perpendicular to the optical axis) should be produced. In practice, however, there is a play and there is only one translational guide, which is the focus synchronized lever 77. It is therefore necessary to prepare a receiving surface that prevents a shift component from being produced. The portion that prevents a shift component from being produced is the L-shaped position restrictors 79, each of which is a specific example of the receiving surface, provided at three positions spaced apart at 120-degree intervals. The position restrictors 79 face the inner surface of the fixed tube 17 and come into contact with the three fitting raised portions 47.

The shape of the position restrictor 79 will be described below.

The present example is applied to a zoom lens using a focus cam that corrects the amount of travel of the focus lens group in the focusing operation in accordance with the zooming position. Therefore, the variator cam 78 has a circumferential length equivalent to 110 degrees or grater, which is quite large. The variator cam 78 is formed of, for example, a portion corresponding to the zoom rotation angle, 70 degrees, a portion corresponding to the focus rotation angle, 40 degrees, and a portion corresponding to an angle that may be required in an assembly operation.

Therefore, as shown in FIG. 20 and FIGS. 23A, 23B, the end in the telescopic-side near (T NEAR) position of one of the variator cams 78 overlaps the end in the wide-angle-side infinity (W INF) position of the adjacent variator cam 78, thus creating an overlap OR. When one attempts to produce the position restrictor, which is the receiving surface, in such a situation, there is no choice but to shift the position restrictor in the optical axis direction in order to prevent interference with the focus cam (variator cam 78).

However, to maintain a high magnification factor and high optical performance in a lens barrel of this type, it is necessary to increase the amount of travel of the second lens group 2. To reach the telescopic-side near (T NEAR) position, as shown in FIG. 28B, the focus cam ring 25 travels a long distance relative to the fixed tube 17. Therefore, when the position of the horizontal portion 79a of the current position restrictor 79 is shifted to the horizontal position of the reinforcing rib 79c, the position restrictor 79 disengages and comes off the fitting raised portion 47 of the fixed tube 17.

To address the problem, in the present example, the horizontal portion 79a of the position restrictor 79 is provided in a position where the position regulator 79 will not come off the fitting raised portion 47 of the fixed tube 17 and the position restrictor 79 will not interfere with the focus cam (variator cam) even in the telescopic-side near (T NEAR) position. The portion of the receiving surface that interferes with the variator cam 78, which is the focus cam, is configured in such a way that the horizontal portion 79a is bent at one end thereof vertically in the optical axis direction to form the vertical portion 79b. In this configuration, the vertical portion 79b can support the fixed tube 17 and the focus cam ring 25 can travel a long distance in the optical axis direction relative to the fixed tube 17.

FIGS. 32 to 35 explain the advantageous effect of the position restrictors 79 at various zooming and focusing positions. FIGS. 32 to 35 are superimposed developments of the fixed tube 17, the focus cam ring 25, and the second-group moving frame 75 and show the relative positional relationship among them at the wide-angle-side infinity (W INF) position, the wide-angle-side near (W NEAR) position, the telescopic-side infinity (T INF) position, and the telescopic-side near (T NEAR) position, respectively.

Figure 32:
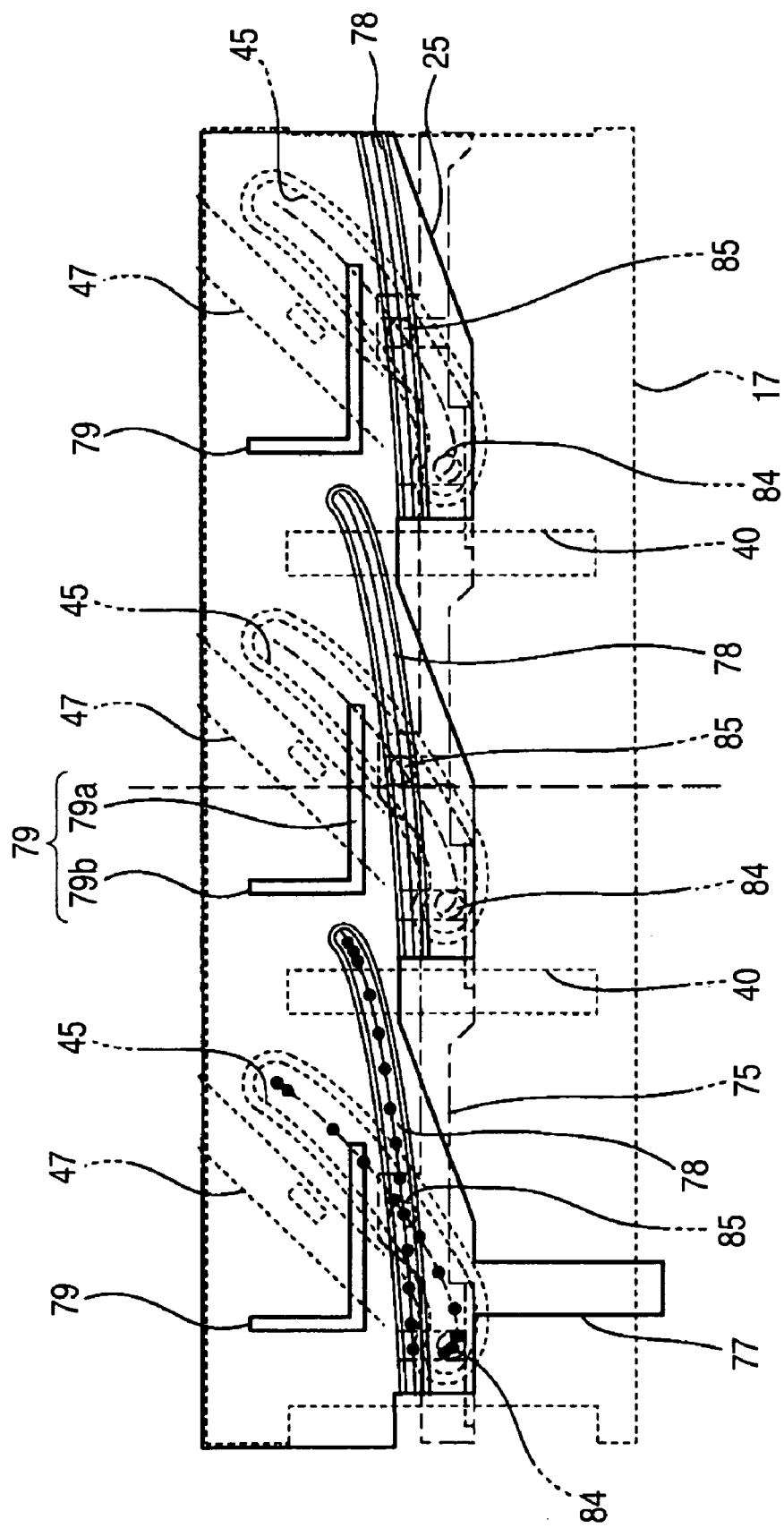
FIG. 32 explains the relationship among the actions of the fixed tube, the second-group moving frame, and the focus cam ring in the lens barrel according to an embodiment of the invention, and is the development in the infinity position (INF) on the wide-angle side.
Figure 33:
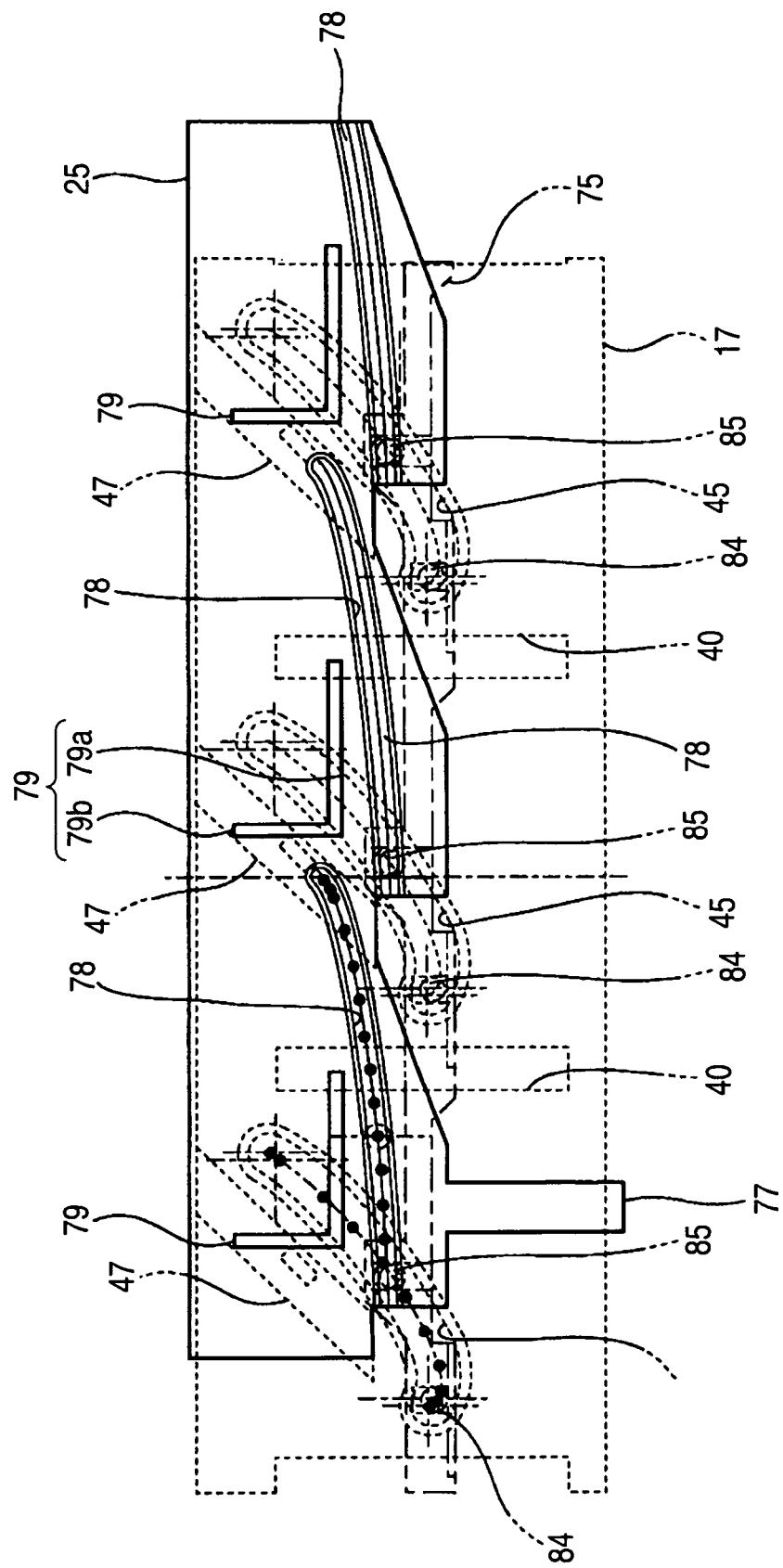
FIG. 33 explains the relationship among the actions of the fixed tube, the second-group moving frame, and the focus cam ring in the lens barrel according to an embodiment of the invention, and is the development in the near position (NEAR) on the wide-angle side.

As shown in FIG. 32, in the wide-angle-side infinity (W INF) position, since the fitting raised portions 47 of the fixed tube 17 are in contact with and supported by the entire position restrictors 79, the focus cam ring 25 will not come off. Further, as shown in FIG. 33, in the wide-angle-side near (W NEAR) position, since the fitting raised portions 47 of the fixed tube 17 are in contact with and supported by the entire position restrictors 79, the focus cam ring 25 will not come off.

Figure 34:
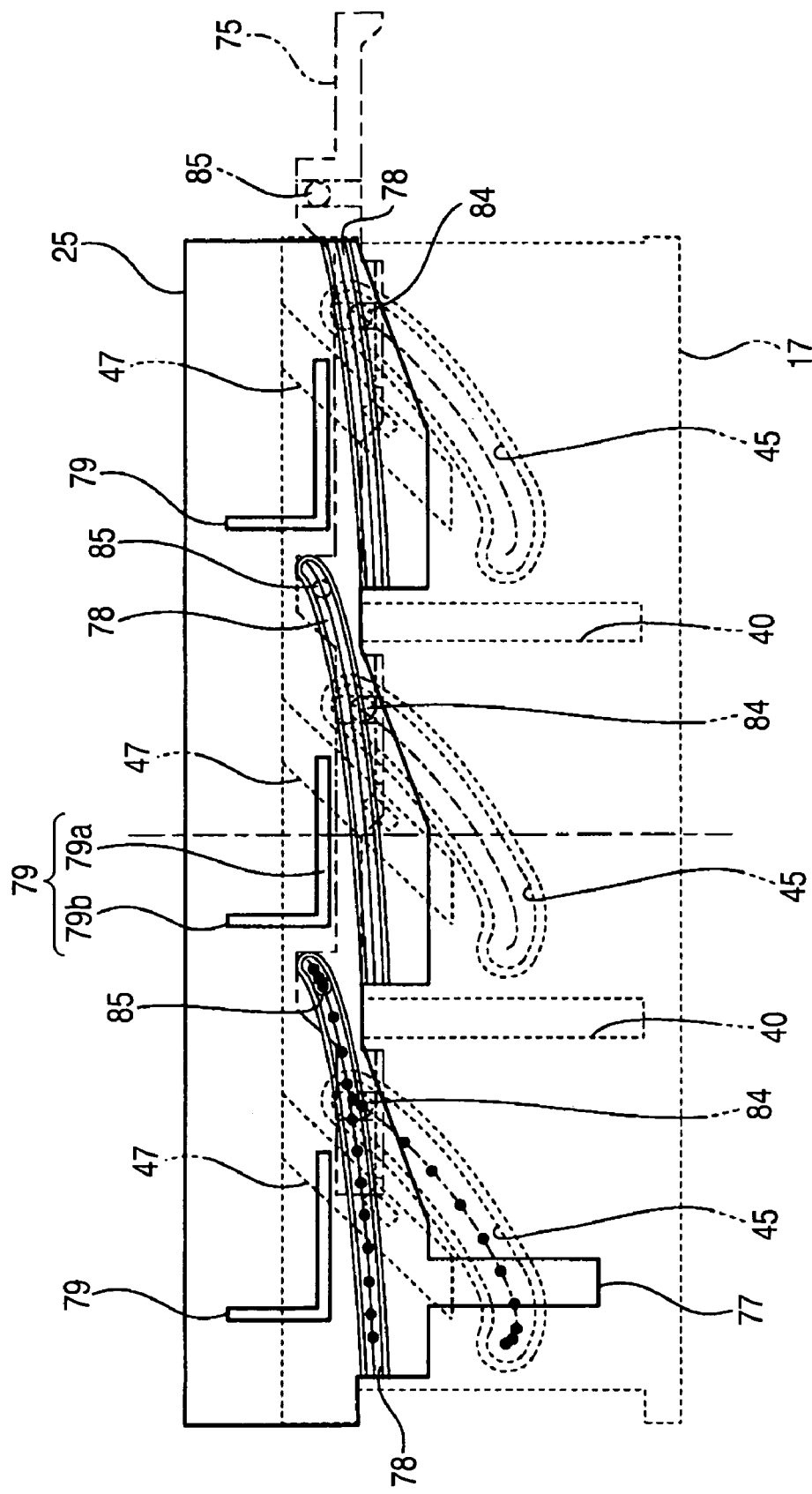
FIG. 34 explains the relationship among the actions of the fixed tube, the second-group moving frame, and the focus cam ring in the lens barrel according to an embodiment of the invention, and is the development in the infinity position (INF) on the telescopic side.

On the other hand, as shown in FIG. 34, in the telescopic-side infinity (T INF) position, since the fitting raised portions 47 of the fixed tube 17 are in contact with and supported by the vertical portions 79b of the position restrictors 79, the focus cam ring 25 will not come off. Further, as shown in FIG. 35, in the telescopic-side near (T NEAR) position, since the fitting raised portions 47 of the fixed tube 17 are in contact with and supported by the horizontal portions 79a of the position restrictors 79, the focus cam ring 25 will not come off.

As apparent from FIGS. 32 to 35, when the position restrictors 79 do not have the vertical portions 79b, the focus cam ring 25 comes off the fitting raised portions 47 of the fixed tube 17 in the telescopic-side infinity (T INF) position, so that the focus cam ring 25 may not be supported. To prevent the focus cam ring 25 from coming off the fixed tube 17, it is conceivable to extend the horizontal portion 79a of each of the position restrictors 79 in the circumferential direction. In this case, however, the extended horizontal portion 79a interferes with the variator cam 78, which hence will not function as a cam. To avoid such a situation, it is conceivable to shift the horizontal portion 79a of the position restrictor 79 in the optical axis direction. In this case, however, the focus cam ring 25 comes off the fitting raised portions 47 of the fixed tube 17 in the telescopic-side near (T NEAR) position.

To prevent the focus cam ring 25 from coming off the fixed tube 17 and support the focus cam ring 25 by the fixed tube 17 in all the positions, it is necessary to bend the receiving surface of the position restrictor, or increasing the size of the entire lens barrel, or downgrading the optical performance and specifications to reduce the amount of focus or travel of the second lens group 2. The present example is configured based on the above viewpoints, and the position restrictor 79 according to the example allows reduction in size and enhancement in performance of the lens barrel. In the example, the critical portion of the position restrictor 79 has an L shape, but does not necessarily have an L shape. For example, it is of course conceivable to use dead space of the focus cam ring 25 and bend the portion of the receiving surface that interferes with the focus cam (variator cam).

A description will be made of an example of the imaging apparatus using the thus configured lens barrel. FIGS. 36 to 39 explain a digital single lens reflex camera showing a specific example of the imaging apparatus according to an embodiment of the invention. As shown in FIG. 36, a digital single lens reflex camera 100 includes a camera body 101. The lens barrel 10, which is an interchangeable imaging lens unit, is detachably attached to the camera body 101.

The camera body 101 includes an annular mount MT, to which the lens barrel 10 is attached, at a substantially central portion of the front side. An attachment/detachment button 102 for attaching and detaching the lens barrel 10 is provided in the vicinity of the mount MT. The camera body 101 further includes a mode setting dial 103 in an upper left position on the front side. Operating the mode setting dial 103 allows a variety of modes of the camera to be set (switched) (the modes include a variety of imaging modes (a portrait imaging mode, a scenery imaging mode, and a fully automatic imaging mode), a playback mode for playing back captured images, and a communication mode for sending and receiving data to and from an external apparatus).

The camera body 101 further includes a grip 104 at the left end of the front side. The user holds the grip 104 when taking photographs. A release button 105 for instructing the camera to start exposure is provided on the upper side of the grip 104. A battery container and a card container are provided in the grip 104. The battery container contains a lithium-ion battery or other types of battery as a power supply for the camera, and the card container detachably contains a memory card or other external storage devices for recording image data of captured images.

The release button 105 is a two-state detection button capable of detecting two states, a half-pressed state (S1 state) and a fully-pressed state (S2 state). When the release button 105 is pressed halfway into the S1 state, preparation actions (AF control action, for example) for capturing and recording a still image of a subject (final captured image) are carried out. When the release button 105 is further pressed into the S2 state, actions of capturing a final captured image are carried out {a series of actions including an exposure action for a subject image (an optical image of a subject) using an imaging device and a predetermined image processing action on a image signal obtained by the exposure action}.

In FIG. 37, a finder window (eyepiece window) 110 is provided at a substantially upper central portion on the backside of the camera body 101. When taking a photograph, the user looks into the finder window 110 and visually recognizes an optical image of a subject delivered through the lens barrel 10 to determine a composition. That is, the optical finder can be used to determine a composition. In the digital single lens reflex camera 100 according to the embodiment, live-view images displayed in a backside monitor 111 can also be used to determine a composition. The operator rotates a switch dial 106 to switch the composition determination action between those using the optical finder and the live-view display.

The backside monitor 111 is provided at a substantially central portion of the backside of the camera body 101. The backside monitor 111 is, for example, formed of a color liquid crystal display (LCD). The backside monitor 111 can, for example, display a menu screen for setting imaging and other conditions, and reproduce and display a captured image recorded on the memory card in a playback mode. When the operator chooses the live-view-display-based composition determination instead of the optical-finder-based composition determination, the backside monitor 111 displays a plurality of time-course images (that is, moving images) captured by the imaging device as live-view images.

A power supply switch (main switch) 112 is provided to the upper left of the backside monitor 111. The power supply switch 112 is formed of a two-contact slide switch. When the contact is set to a left "OFF" position, the power supply is turned off. When the contact is set to a right "ON" position, the power supply is turned on. Further, a direction selection key 113 is provided to the right of the backside monitor 111. The direction selection key 113 has a circular operation button. The operation button detects four types of pressing operation, up, down, right, and left, and another four types of pressing operation, upper right, upper left, lower right, and lower left. The direction selection key 113 detects the operation of pressing a center push button as well as the above eight pressing operations. A group of setting buttons 114 are provided to the left of the backside monitor 111. The group of setting buttons 114 are formed of a plurality of buttons for performing various operations including setting parameters in the menu screen and deleting images.

FIG. 38 is a longitudinal cross-sectional view of the digital single lens reflex camera 100. The camera body 101 houses an imaging device 120 formed of a CCD, a CMOS, or other devices, a primary mirror 121, a secondary mirror 122, a pentamirror 123, a focusing plate 124, an optical unit 125, and other components. The image of a subject introduced through the lens barrel 10 is guided to the finder window 110 via the primary mirror 121, the pentamirror 123, and the optical unit 125. The primary mirror 121, the pentamirror 123, and the optical unit 125 form a finder optical system, which can guide an observation light beam, a light beam coming through the imaging optical system and reflected off the primary mirror 121, to the finder window 110.

The light that has passed through the primary mirror 121 is reflected off the secondary mirror 122 and redirected downward to an AF module 126. The AF module 126, a focus control unit, and other components use the light delivered via the primary mirror 121 and the secondary mirror 122 to perform AF operation.

An overview of the functions of the digital single lens reflex camera 100 will be described with reference to FIG. 39. FIG. 39 is a block diagram showing a functional configuration of the digital single lens reflex camera 100. The digital single lens reflex camera 100 includes an operation section 130, a general control section 140, a focus control section 141, a mirror control section 142, a shutter control section 143, a timing control circuit 144, and a digital signal processing circuit 150. The operation section 130 includes a variety of buttons and switches including the release button 105. The general control section 140 carries out a variety of actions in response to an input operation made by the user on the operation section 130.

The general control section 140 is configured as a microcomputer and primarily includes a CPU, a memory, and a ROM. The general control section 140 performs a variety of functions by reading programs stored in the ROM and instructing the CPU to execute the programs. For example, the general control section 140 includes a first exposure control section 146 and a second exposure control section 147 functionally implemented by executing respective programs. The first exposure control section 146 controls exposure for an imaging device 180 for the finder. In an EVF mode, the first exposure control section 146 basically controls exposure for the finder imaging device 180 based on an image signal therefrom. The general control section 140, however, when a particular condition is satisfied (in other words, when a particular timing is reached), determines an exposure control value in the exposure control operation based on a photometric value obtained by a photometric sensor.

The second exposure control section 147 controls exposure for the imaging device 120. The second exposure control section 147 determines a photometric value of a subject (subject brightness) based on an image signal from the finder imaging device 180, the exposure operation of which is controlled by the first exposure control section 146, and controls exposure for the imaging device 120 based on the subject brightness.

Further, the general control section 140 cooperates with the AF module 126, the focus control section 141, and other components to perform a focus control operation in which the position of the focus lens group is controlled. The general control section 140 uses the focus control section 141 to perform the AF operation in accordance with the focused state of a subject detected by the AF module 126. The AF module 126 can use the light delivered through a mirror mechanism 160 to detect the focused state of a subject by using a focused state detection method, such as a phase difference method.

The focus control section 141 moves the focus lens group contained in a lens group 190 in the lens barrel 10 by generating a control signal based on a signal inputted from the general control section 140 and driving a motor M1 accordingly. The position of the focus lens group is detected by a lens position detection section 191 in the lens barrel 10, and data indicative of the position of the focus lens group is sent to the general control section 140. The focus control section 141, the general control section 140, and other components thus control the motion of the focus lens group in the optical axis direction.

The mirror control section 142 switches the mirror mechanism 160 between the state in which it retracts from the optical path (mirror-up state) and the state in which it blocks the optical path (mirror-down state). The mirror control section 142 switches the mirror mechanism 160 between the mirror-up state and the mirror-down state by generating a control signal based on the signal inputted from the general control section 140 and driving a motor M2 accordingly. The shutter control section 143 opens and closes a shutter 170 by generating a control signal based on the signal inputted from the general control section 140 and driving a motor M3 accordingly. The timing control circuit 144 performs timing control on the imaging device 120 and other components.

The imaging device (formed of a CCD sensor, a CMOS sensor, or other sensors) 120 uses opto-electric conversion to convert an optical image of a subject into an electric signal to produce an image signal representing a final captured image (image signal to be recorded). The imaging device 120 is also referred to as an imaging device for capturing an image to be recorded. Further, the imaging device 120 responds to drive control signals (an accumulation start signal and an accumulation end signal) inputted from the timing control circuit 144 and detects the subject image focused on the light receiving surface (accumulates the charge created in the opto-electric conversion) so as to produce an image signal representing the subject image. The imaging device 120 further responds to a readout control signal inputted from the timing control circuit 144 and outputs the image signal to a signal processing section 151.

A timing signal (synchronization signal) from the timing control circuit 144 is also inputted to the signal processing section 151 and an A/D (analog-to-digital) conversion circuit 152. The image signal captured by the imaging device 120 undergoes predetermined analog signal processing in the signal processing section 151, and the image signal that has undergone the analog signal processing is converted into digital image data (image data) in the A/D conversion circuit 152. The image data is inputted to the digital signal processing circuit 150.

The digital signal processing circuit 150 performs digital signal processing on the image data inputted from the A/D conversion circuit 152 to produce image data representing the captured image. The digital signal processing circuit 150 includes a black-level correction circuit 153, a white balance (WB) circuit 154, a γ-correction circuit 155, and an image memory 156.

The black-level correction circuit 153 corrects the black level of each image data that forms the image data outputted from the A/D conversion circuit 152 into a reference black level. The WB circuit 154 makes white balance adjustment on an image. The γ-correction circuit 155 performs grayscale conversion on a captured image. The image memory 156 is accessible at a high speed and temporarily stores generated image data. The image memory 156 has a capacity for storing image data that correspond to a plurality of frames.

In the final capturing operation, the image data temporarily stored in the image memory 156 undergo image processing (image compression, for example) as appropriate in the general control section 140, and are then stored in a memory card 115 via a card I/F 132. The image data temporarily stored in the image memory 156 are transferred by the general control section 140 to a VRAM 131 as appropriate, and an image based on the image data is displayed on the backside monitor 111. Various display modes are thus provided, including confirmation display (after view) for confirming captured images and playback display for reproducing captured images.

The imaging device 180 serves as a so-called live-view image capturing (moving image capturing) imaging device. The imaging device 180 has a configuration similar to that of the imaging device 120. The imaging device 180, however, only needs to have resolution high enough to produce a live-view image signal (moving images), and hence typically has pixels fewer than those in the imaging device 120. Signal processing similar to that performed on an image signal captured by the imaging device 120 is also performed on an image signal captured by the imaging device 180. That is, an image signal captured by the imaging device 180 undergoes predetermined processing in the signal processing section 151, is converted into digital data in the A/D conversion circuit 152, undergoes predetermined image processing in the digital signal processing circuit 150, and is stored in the image memory 156.

Time-course image data captured by the imaging device 180 and stored in the image memory 156 are sequentially transferred by the general control section 140 to the VRAM 131 as appropriate, and a plurality of images based on the time-course image data are sequentially displayed on the backside monitor 111. Moving image-like display (live-view display) for composition determination is thud provided.

To speed up the above processes, in particular, it is preferable to concurrently perform the image processing for the imaging device 120 and the image processing for the imaging device 180. To this end, in the embodiment, each of the timing control circuit 144, the signal processing section 151, the A/D conversion circuit 152, the digital signal processing circuit 150, and other components has a two-route processing circuit, and the image processing operations for the two imaging devices 120 and 180 are concurrently carried out. Each of the timing control circuit 144, the signal processing section 151, the A/D conversion circuit 152, the digital signal processing circuit 150, and other components, however, does not necessarily have a two-route processing circuit but a single-route processing circuit, and the image processing for the imaging device 120 and the image processing for the imaging device 180 may be sequentially carried out in this order or in the reverse order.

The digital single lens reflex camera 100 further includes a communication I/F 133 and can send and receive data to and from an apparatus (a personal computer, for example) that is connected to the interface 133. The digital single lens reflex camera 100 further includes a flash device 116, a flash control circuit 117, and an AF auxiliary light generator 127. The flash device 116 is a light source used, for example, when a subject does not have enough brightness. Turning on and off the flash, turn-on duration, and other parameters are controlled by the flash control circuit 117, the general control section 140, and other components. The AF auxiliary light generator 127 is an auxiliary light source for the AF operation. Turning on and off the AF auxiliary light generator 127, turn-on duration, and other parameters are controlled by the general control section 140 and other components.

The capturing action of the digital single lens reflex camera 100 will be described below. In the digital single lens reflex camera 100, not only can the optical finder formed of the finder optical system and other components {also referred to as an optical viewfinder (OVF)} be used to determine a composition (framing), but also live-view images displayed on the backside monitor 111 can be used to determine a composition. The finder function implemented by using the imaging device 180 and the backside monitor 111 is also referred to as an electronic viewfinder (EVF) because an optical image of a subject is converted into electronic data and then visualized.

The operator can operate the switch dial 106 to choose the optical viewfinder (OVF)-based composition determination or the electronic viewfinder (EVF)-based composition determination.

As shown in FIG. 38, the mirror mechanism 160 is provided in the optical path (imaging optical path) starting from the lens barrel 10 to the imaging device 120, and the mirror mechanism 160 has the primary mirror 121 (primary reflection surface) that reflects the light from the imaging optical system upward. Part or the entire of the primary mirror 121 is, for example, formed of a half-silvered mirror, and transmits part of the light from the imaging optical system. The mirror mechanism 160 also has the secondary mirror 122 (secondary reflection surface) that reflects the light that has passed through the primary mirror 121 downward. The light reflected off the secondary mirror 122 downward is guided to and incident on the AF module 126, and used for phase difference-based AF operation.

In the image capturing mode, the mirror mechanism 160 is in the mirror-down state before the release button 105 is pressed into the fully-pressed state S2, in other words, in the composition determination step. In this step, a subject image from the lens barrel 10 is reflected off the primary mirror 121 upward and incident on the pentamirror 123 as an observation light beam. The pentamirror 123 has a plurality of mirrors (reflection surfaces) and has a capability of adjusting the orientation of the subject image. The path of the observation light beam after it is incident on the pentamirror 123 depends on which of the two schemes (that is, either the OVF scheme or the EVF scheme) is used to determine a composition. The operator can determine a composition by choosing a desired one.

The invention described above is not limited to the lens barrel using the focus cam that corrects the amount of travel of the focus lens group in the focusing operation in accordance with the zooming position, but is applicable not only of course to a typical zoom lens but also to a zooming capability alone or a focusing capability alone.

The invention is not limited to the embodiment described above and illustrated in the drawings, but a variety of modifications can be implemented to the extent that they do not depart from the spirit of the invention. For example, while the above example has been described with reference to the case where a digital single lens reflex camera is applied as the imaging apparatus, the invention is applicable to a digital video camcorder, a film-type single lens reflex camera, an analog video camcorder, a surveillance camera, and other imaging apparatus. Further, while the above example has been described with reference to the case where a four-group lens system is used as an optical lens, the optical lens may of course be formed of a three-group lens system, a five-group lens system, or a lens system formed of more groups.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel including at least two cam tubes in which an operation based on the rotation of an operation ring actuates the two cam tubes to move a lens group, the lens barrel comprising:

a first cam tube that drives part of the lens group in response to the operation based on the rotation of the operation ring; and a second cam tube that moves part of the lens group in an optical axis direction in response to the operation based on the rotation of the operation ring, the second cam tube rotating at a speed different from that of the first cam tube.

2. The lens barrel according to claim 1, wherein the operation ring is a zooming operation ring for a zooming operation, the first cam tube is a zoom cam ring that drives part of the lens group in response to the zooming operation based on the rotation of the zooming operation ring, and the second cam tube is a first-group cam ring that moves part of the lens group in the optical axis direction in response to the zooming operation based on the rotation of the zooming operation ring, the second cam tube rotating at the speed that is different from that of the first cam tube.

3. The lens barrel according to claim 2, wherein the first cam tube rotates at the same speed as that of the operation ring, and the second cam tube rotates at a speed different from that of the operation ring.

4. The lens barrel according to claim 2, wherein the second cam tube rotates at a speed slower than that of the first cam tube.

5. The lens barrel according to claim 2, further comprising a third cam tube having a raised portion and a fixed tube having a lead groove that slidably engages the raised portion, wherein the fixed tube is held not to rotate.

6. An imaging apparatus comprising:

a lens barrel including at least two cam tubes in which an operation based on the rotation of an operation ring actuates the two cam tubes to move a lens group, wherein the lens barrel includes a first cam tube that drives part of the lens group in response to the operation based on the rotation of the operation ring, and a second cam tube that moves part of lens group in an optical axis direction in response to the operation based on the rotation of the operation ring, the second cam tube rotating at a speed different from that of the first cam tube.

* * * * *